(12) United States Patent
Stewart

(10) Patent No.: US 10,839,487 B2
(45) Date of Patent: Nov. 17, 2020

(54) METHODS AND APPARATUS FOR ENHANCING OPTICAL IMAGES AND PARAMETRIC DATABASES

(71) Applicant: Michael Edwin Stewart, Menlo Park, CA (US)

(72) Inventor: Michael Edwin Stewart, Menlo Park, CA (US)

( * ) Notice: Subject to any disclaimer, the term of this patent is extended or adjusted under 35 U.S.C. 154(b) by 157 days.

(21) Appl. No.: 15/264,059

(22) Filed: Sep. 13, 2016

(65) Prior Publication Data
US 2017/0084006 A1   Mar. 23, 2017

Related U.S. Application Data

(60) Provisional application No. 62/263,418, filed on Dec. 4, 2015, provisional application No. 62/251,596, filed on Nov. 5, 2015, provisional application No. 62/220,159, filed on Sep. 17, 2015.

(51) Int. Cl.
*G06T 5/00* (2006.01)
*H04N 1/60* (2006.01)
*G06F 16/51* (2019.01)

(52) U.S. Cl.
CPC ............ *G06T 5/002* (2013.01); *G06F 16/51* (2019.01); *G06T 5/003* (2013.01); *G06T 5/008* (2013.01); *H04N 1/6027* (2013.01); *G06T 2207/20016* (2013.01); *G06T 2207/20048* (2013.01)

(58) Field of Classification Search
CPC ....... G06T 5/00–50; G06T 2207/20048; G06F 17/30846; G06F 17/3028; H04N 1/6027
See application file for complete search history.

(56) References Cited

U.S. PATENT DOCUMENTS 4,636,850 A    1/1987  Stewart
6,252,931 B1 *  6/2001  Aach ...................... G06T 5/004
                                                     378/98.2

(Continued)

*Primary Examiner* — Sean T Motsinger
(74) *Attorney, Agent, or Firm* — JW Law Group; James M. Wu

(57) ABSTRACT

Methods and apparatus for enhancing optical images and parametric databases are disclosed. In an exemplary embodiment, a method includes identifying an image and deconstructing the image into a frequency-based spatial domain representation utilizing a pyramidal data structure including a plurality of levels on a frequency-by-frequency basis. The method also includes modifying the frequency-based spatial domain representation to generate a modified frequency-based spatial domain representation, reconstructing an enhanced image from the modified frequency-based spatial domain representation, and returning the enhanced image. In an exemplary embodiment, an apparatus includes a deconstructor that deconstructs an image into a frequency-based spatial domain representation utilizing a pyramidal data structure including a plurality of levels on a frequency-by-frequency basis and a modifier that modifies the frequency-based spatial domain representation to generate a modified representation. The apparatus also includes a reconstructor that reconstructs an enhanced image from the modified representation and returns the enhanced image.

74 Claims, 15 Drawing Sheets
(6 of 15 Drawing Sheet(s) Filed in Color)

(56) References Cited

U.S. PATENT DOCUMENTS

| | | | |
|---|---|---|---|
| 7,257,271 B2* | 8/2007 | Adams, Jr. | G06T 5/002 382/167 |
| 9,292,908 B2 | 3/2016 | Stewart | |
| 10,217,197 B2* | 2/2019 | Mantiuk | H04N 1/6005 |
| 2002/0172325 A1* | 11/2002 | Bakalyar | G01N 23/04 378/62 |
| 2003/0161548 A1* | 8/2003 | Vuylsteke | G06T 5/009 382/274 |
| 2003/0198395 A1* | 10/2003 | Lynch | H04N 19/61 382/240 |
| 2004/0022412 A1* | 2/2004 | Iwamura | G06T 1/005 382/100 |
| 2004/0101207 A1* | 5/2004 | Langan | G06T 5/40 382/274 |
| 2005/0128209 A1* | 6/2005 | Meinds | G06T 5/002 345/582 |
| 2005/0141780 A1* | 6/2005 | Takahashi | G06T 5/009 382/260 |
| 2005/0190990 A1* | 9/2005 | Burt | G06T 5/50 382/294 |
| 2005/0265633 A1* | 12/2005 | Piacentino | G06T 5/50 382/302 |
| 2006/0013504 A1* | 1/2006 | Trumer | G06T 5/10 382/279 |
| 2006/0114479 A1* | 6/2006 | John | G06T 3/4053 358/1.2 |
| 2007/0183684 A1* | 8/2007 | Bhattacharjya | G06T 5/40 382/274 |
| 2007/0189630 A1* | 8/2007 | Lei | G06T 5/002 382/254 |
| 2008/0152251 A1* | 6/2008 | Florent | G06T 5/20 382/260 |
| 2008/0205784 A1* | 8/2008 | Akgun | H04N 7/0135 382/254 |
| 2008/0292202 A1* | 11/2008 | Vakrat | H04N 5/357 382/261 |
| 2009/0034868 A1* | 2/2009 | Rempel | G09G 3/3426 382/264 |
| 2009/0202167 A1* | 8/2009 | Muijs | G06T 5/007 382/254 |
| 2010/0066874 A1* | 3/2010 | Ishiga | H04N 5/208 348/252 |
| 2010/0142790 A1* | 6/2010 | Chang | G06T 5/009 382/132 |
| 2010/0146026 A1* | 6/2010 | Christoph | H03H 17/0272 708/313 |
| 2010/0272369 A1 | 10/2010 | Hiraga et al. | |
| 2011/0229019 A1* | 9/2011 | Batur | G06T 5/002 382/159 |
| 2011/0255781 A1* | 10/2011 | Hamsici | G06K 9/4671 382/170 |
| 2012/0019726 A1* | 1/2012 | Arora | H04N 21/84 348/602 |
| 2012/0076403 A1* | 3/2012 | Nestares | G06T 5/50 382/167 |
| 2012/0106866 A1* | 5/2012 | Minakawa | G06T 3/0018 382/274 |
| 2013/0120385 A1* | 5/2013 | Krishnaswamy | G06T 15/50 345/426 |
| 2013/0322753 A1 | 12/2013 | Lim et al. | |
| 2014/0064632 A1* | 3/2014 | Manabe | G06T 5/009 382/254 |
| 2014/0177890 A1 | 6/2014 | Hojlund et al. | |
| 2014/0177974 A1* | 6/2014 | Park | G06T 5/20 382/275 |
| 2015/0195430 A1* | 7/2015 | Wadhwa | H04N 5/144 348/581 |
| 2015/0379726 A1* | 12/2015 | Kawamura | G06T 7/269 382/103 |
| 2016/0148359 A1* | 5/2016 | Gnedin | G06T 5/20 382/264 |
| 2017/0084006 A1* | 3/2017 | Stewart | G06T 5/003 |
| 2017/0148165 A1* | 5/2017 | Houjou | G06T 7/0012 |
| 2017/0161882 A1* | 6/2017 | Mantiuk | H04N 1/6027 |
| 2017/0366796 A1* | 12/2017 | Goldentouch | H04N 13/239 |
| 2018/0139377 A1* | 5/2018 | Zhang | G06K 9/00228 |
| 2019/0208186 A1* | 7/2019 | Kawabe | H04N 13/268 |

* cited by examiner

1700

1702

METHODS AND APPARATUS FOR ENHANCING OPTICAL IMAGES AND PARAMETRIC DATABASES

CLAIM TO PRIORITY

This application claims the benefit of priority based upon U.S. Provisional Patent Application having Application No. 62/220,159, filed on Sep. 17, 2015, and entitled "METHOD AND APPARATUS FOR ENHANCING IMAGES" and U.S. Provisional Patent Application having Application No. 62/251,596, filed on Nov. 5, 2015, and entitled "METHOD AND APPARATUS FOR ENHANCING OPTICAL IMAGES" and U.S. Provisional Patent Application having Application No. 62/263,418, filed on Dec. 4, 2015, and entitled "METHOD AND APPARATUS FOR ENHANCING OPTICAL IMAGES AND PARAMETRIC DATABASES" all of which are hereby incorporated herein by reference in their entirety.

FIELD

The present invention relates to digital imaging, and more particularly to systems, apparatus, and methods for digital image enhancement.

BACKGROUND

Digital images have a multitude of uses in all areas of society. For example, images may be digitally captured by users using a variety of devices. These digital images then may be displayed to users in both digital and print media.

To that end, there exists a high demand for improving the clarity, sense of depth, and visual appeal of digital images. However, various current solutions face problems halos or ringing, gradient reversal, highlight and shadow loss, flatness, color gamut management, and otherwise unrealistically remapped images, and fail to provide flexible full-spatial frequency control.

In a contrasting example, there is high demand for reducing contrast at various frequencies for simulating fog and haze effects; for more flattering rendering of portraits and for selective defocus effects.

For another example, there is high demand for effective noise filtering, especially for low frequency chroma mottle.

For another example, there is a high demand for temporal data utilization to improve noise reduction and clarity enhancement in video or stills derived from a plurality of images and for video effects and in computer games. Furthermore, there is high demand for interactive user control over the clarity presented by televisions and over the clarity of compressed video streams in general.

For another example, there is a high demand for 3D data enhancement, such as for the better visualization of anatomical structures, surfaces, or membranes from CT, MRI or acoustic sources, or for enhanced x-ray visualization of cardiac ventricles and valves without use of contrast material, or for better visualization and identification of geological structures in fields such as energy or mineral exploration, or oceanic data, or cosmological representations, or molecular representations or crystalline visualizations, or for better visualization and identification of low frequency gradients and shapes, such as thermal or pressure gradients.

For another example, there is a high demand for enhancement of databases with greater numbers of dimensions and parameters, including by example, temporal for enhanced visualization of weather models, high energy reaction modeling, or for 5D plenoptic cameras or for 4D light fields, or statistical quantum visualizations.

For another example, there is a high demand for 1D data enhancement, such as for the enhancement and filtering of conventional signals such as by example, audio or radio, especially in ranging devices such as sonar, radar, and doppler radar. Further, this may be useful in telemetry analysis for the selective amplification of desired frequencies or attenuation of undesired frequencies, especially in the case of analog signals that are digitized and packetized for communication prior to analysis, especially where rapid processing speeds are important.

For another example, other types of image processing share similar data structures and computations such as pyramids, pattern recognition and tracking, and feature registration (motion) vectors, so there is a high demand for integrating these elements to reduce memory, processing, and hardware resources required.

For another example, there is a high demand for low temporal latency for interactive applications such as medical robots or other real-time video.

Unfortunately, current techniques for enhancing digital images have been associated with various problems and limitations and therefore, it is desirable to have methods and apparatus for enhancing images and parametric databases to meet a variety of image processing objectives while overcoming the problems associated with conventional systems.

SUMMARY

In various exemplary embodiments, methods, apparatus, and system for enhancing images and parametric databases are disclosed. For example, in an exemplary embodiment, a Unified Frequency Transform (UFT) is disclosed that operates to enhance images and parameters databases.

Methods, apparatus, system, and computer program product are provided for enhancing an image utilizing a Unified Frequency Transform (UFT). In use, an image is identified. Additionally, the identified image is enhanced, utilizing a Unified Frequency Transform. Further, the enhanced image is returned. The UFT may include a single, unified computational process for image enhancement that addresses a multitude of photographic problems. The UFT may perform spatially localized tonemapping in a manner that can be tuned and adjusted to emulate human perceptual physiology producing the least visible halos or gradient reversal. Further, the UFT may spatially correct unwanted color changes including gamut excursions caused by brightness changes introduced by the local tonemapping and other processing. Additionally, the UFT may perform multi-resolution contrast enhancement that produces visually sharpened and clearer images across a wide range of subsequent image resizing, medium-resolution enhancement that improves clarity, and low resolution enhancement that improves the visualization of contours and 3D relationships. Further, the UFT may perform noise filtration in multiple spatial frequencies. Further, local tonemapping, sharpening, filtering, and gamut correction may all be done independently or in combination with one another within the UFT. Further, the UFT may perform mixed illuminant color correction. Further, the UFT may provide its lower resolution image representations through interfaces to other image processing algorithms, such as by example, Pattern or Face Recognition and Image Stabilization and UFT processing of this data may be useful to these algorithms. Further still, UFT may receive lower resolution image representations through such interfaces from other image processing algorithms. By both importing and exporting image representations through interfaces with other external image processing algorithms UFT may augment its capabilities.

Significantly, control interfaces for a UFT engine may be greatly facilitated by the widespread use of Programmable Unit Interval Transforms (PUITs) to normalize control variables over the unit interval in an extremely flexible manner allowing for great reusability in control designs.

Importantly, the UFT may be extended by induction to a plurality of dimensions and comprehending an arbitrary plurality of varying parameters, including non-imaging ones, for novel deployment in a wide variety of data analysis applications, and for better visualization of relationships such as surfaces, contours, and translucent structures.

Also, the UFT may be computationally efficient compared to other methods. The UFT may be readily implemented in contemporary SIMD CPU engines such as SSE (Intel) or Neon (Arm). UFT may be readily implemented in OpenGL ES2 shaders and that can be run in a wide variety of contemporary Graphics Processing Units (GPUs) for greater performance and lower power consumption. The UFT may also outperform other methods in both image quality and computational speed.

Additionally, the UFT lends itself to novel implementation in direct hardware for applications with extremely low latency requirements.

Significantly, the UFT lends itself to inclusion into image compression and decompression streams such as jpeg, and especially mpeg, where it could be adjusted and controlled by the preferences of the end user.

In an exemplary embodiment, a method is provided that includes identifying an image and deconstructing the image into a frequency-based spatial domain representation utilizing a pyramidal data structure including a plurality of levels on a frequency-by-frequency basis. The method also includes modifying the frequency-based spatial domain representation to generate a modified frequency-based spatial domain representation, reconstructing an enhanced image from the modified frequency-based spatial domain representation, and returning the enhanced image.

In an exemplary embodiment, an apparatus is provided that includes a deconstructor that deconstructs an image into a frequency-based spatial domain representation utilizing a pyramidal data structure including a plurality of levels on a frequency-by-frequency basis and a modifier that modifies the frequency-based spatial domain representation to generate a modified frequency-based spatial domain representation. The apparatus also includes a reconstructor that reconstructs an enhanced image from the modified frequency-based spatial domain representation and returns the enhanced image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
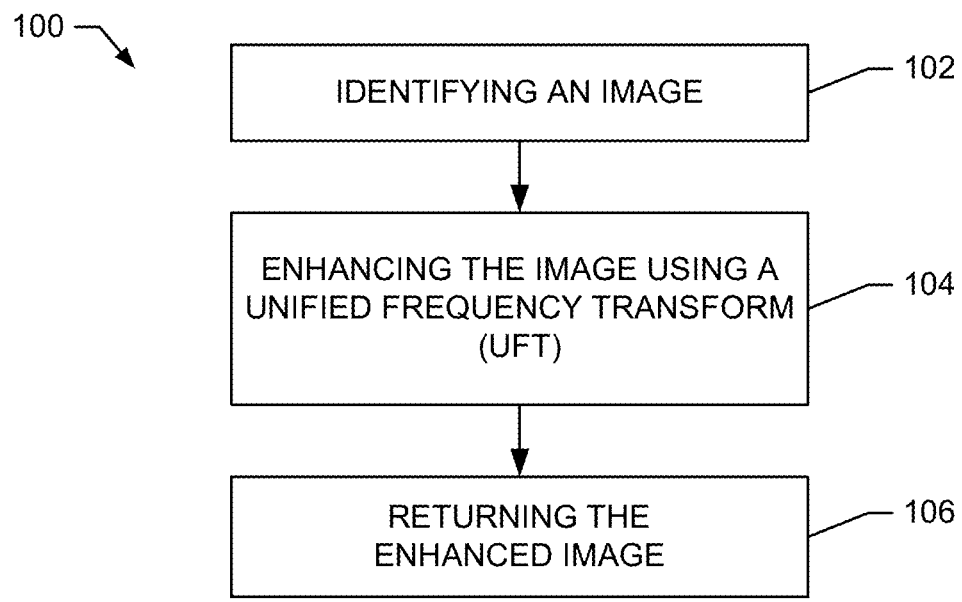
FIG. 1 shows an exemplary method for enhancing an image utilizing a Unified Frequency Transform in accordance with the exemplary embodiments.

Exemplary embodiments of the present invention are described herein in the context of a methods, systems and apparatus for enhancing an image utilizing a Unified Frequency Transform (UFT) performed by a Unified Frequency Transform Engine (UFTE).

In an exemplary embodiment, the UFT is configurable to enhance an image by performing spatially localized tone-mapping on the image.

In an exemplary embodiment, the UFT is configurable to enhance an image by multi-frequency contrast enhancement including amplifying low spatial frequencies for better contour enhancement and depth perception, middle and upper frequencies for better perception of clarity, and highest frequencies for better perception of sharpness.

In an exemplary embodiment, the UFT is configurable to enhance an image by reducing contrast at various frequencies for simulating fog and haze effects, providing more flattering rendering of portraits, and for providing selective defocus effects.

In an exemplary embodiment, the UFT is configurable to enhance an image by providing effective noise filtering, especially for low frequency chroma mottle.

In an exemplary embodiment, the UFT is configurable to provide color gamut management by local tonemapping, combined with conventional gamut management techniques but applied progressively in a multi-frequency manner spatially to prevent gamut excursions.

In an exemplary embodiment, the UFT is configurable to enhance an image by providing temporal data utilization to improve noise reduction.

In an exemplary embodiment, the UFT is configurable to enhance an image by improving noise reduction and clarity enhancement in video or stills derived from a plurality of images and for video effects and in computer games.

In an exemplary embodiment, the UFT is configurable to enhance an image by providing interactive user control over the clarity presented by televisions, and the clarity of compressed video streams in general.

In an exemplary embodiment, the UFT is configurable to enhance an image by providing 3D data enhancement, such as for the better visualization of anatomical structures, surfaces, or membranes from CT, MRI or acoustic sources, or for enhanced x-ray visualization of cardiac ventricles and valves without use of contrast material, or for better visualization and identification of geological structures in fields such as energy or mineral exploration, or oceanic data, or cosmological representations, or molecular representations or crystalline visualizations, or for better visualization and identification of low frequency gradients and shapes, such as thermal or pressure gradients.

In an exemplary embodiment, the UFT is configurable to enhance an image by providing enhancement of databases with greater numbers of dimensions and parameters, including by example temporal for enhanced visualization of weather models, high energy reaction modeling, or for 5D plenoptic cameras or for 4D light fields, or statistical quantum visualizations.

In an exemplary embodiment, the UFT is configurable to enhance an image by providing 1D data enhancement such as for the enhancement and filtering of conventional signals such as by example, audio or radio, especially in ranging devices such as sonar, radar, and doppler radar. Further, this may be useful in telemetry analysis for the selective amplification of desired frequencies or attenuation of undesired frequencies, especially in the case of analog signals that are digitized and packetized for communication prior to analysis, especially where rapid processing speeds are important.

In an exemplary embodiment, the UFT is configurable to enhance an image by providing other types of image processing that share similar data structures and computations such as pyramids, pattern recognition and tracking, and feature registration (motion) vectors, and by integrating these elements to reduce memory, processing, and hardware resources.

In an exemplary embodiment, the UFT is configurable to enhance an image by providing low temporal latency for interactive applications, such as medical robots or other real-time video applications.

FIG. 1 shows a method 100 for enhancing an image utilizing a Unified Frequency Transform in accordance with the exemplary embodiments. As shown in operation 102, an image is identified. In one embodiment, the image may be in a digital format. For example, the image may include a digital image. In another embodiment, the image may include a visual depiction of one or more objects within a scene. In yet another embodiment, the image may be identified in response to the input of the image by a user, application, etc. For example, a user or application may submit the image to be processed, enhanced, etc. In still another embodiment, the image may include an image from a still picture or an image taken from a video stream. In another embodiment an image may represent a database containing a plurality of component parameter values in a plurality of dimensions.

Additionally, as shown in operation 104, the identified image is enhanced utilizing a Unified Frequency Transform. In one embodiment, enhancing the identified image may include performing spatially localized tonemapping on the image. In another embodiment, enhancing the identified image may include spatially performing multi-resolution contrast enhancement and sharpening on the image. In yet another embodiment, enhancing the identified image may include spatially correcting color saturation within the image. In yet another embodiment, enhancing the identified image may include color gamut correction within the image. In still another embodiment, enhancing the identified image may include performing noise filtration on the image. In still another embodiment, enhancing the identified image may include performing mixed illuminant correction on the image.

Furthermore, as shown in the operation at block 106, the enhanced image is returned. For example, the enhanced image is stored back into memory or streamed to another entity, such as an image display device. A more detailed description of the UFT and its applications are provided in the following sections.

Partition of Image Processing into Deconstruction and Reconstruction Phases

Figure 2:
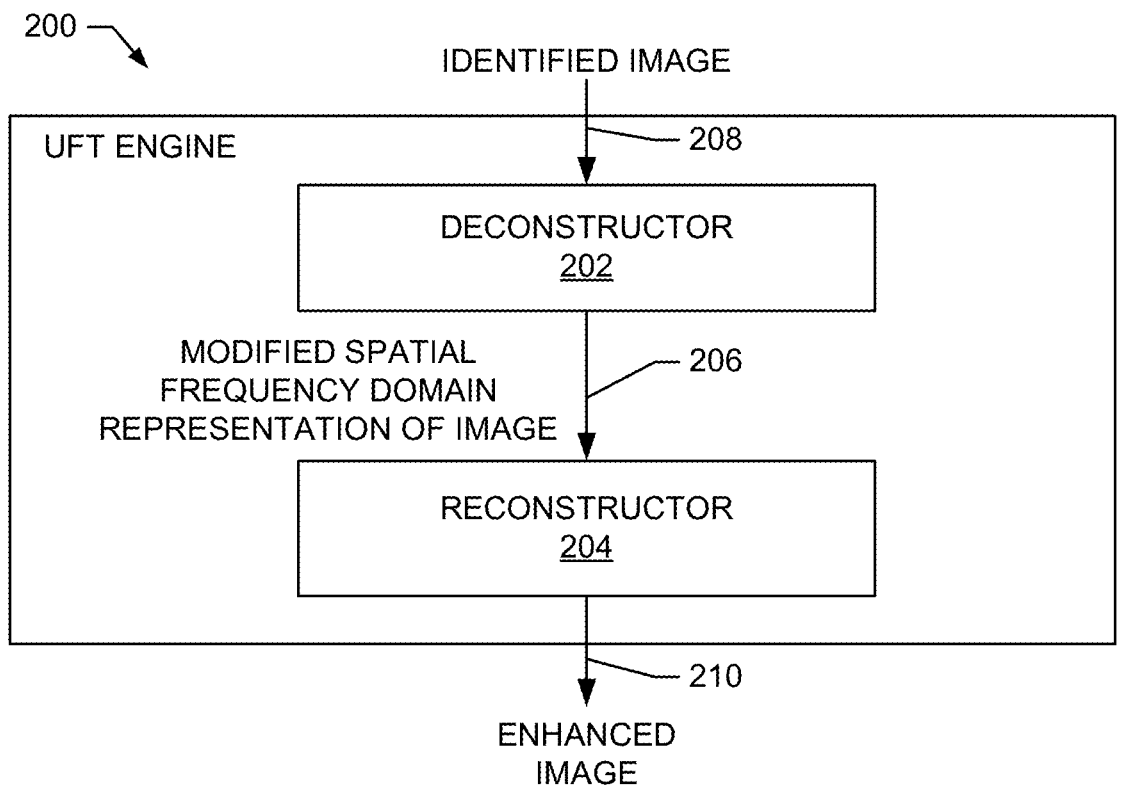
FIG. 2 shows an exemplary embodiment of a Unified Frequency Transform Engine suitable for performing the method of FIG. 1.

FIG. 2 shows an exemplary embodiment of a UFTE 200 suitable for performing the method shown in FIG. 1. In image editing applications, responsiveness is an important consideration. In an exemplary embodiment, responsiveness is improved by partitioning the UFT into deconstruction and reconstruction phases. For example, the deconstruction phase is performed by a deconstructor 202 that accepts the identified image 208 and processes it into a spatial frequency domain representation of the image, which is then modified to generate a modified spatial frequency domain representation of the image 206. The reconstruction phase is performed by a reconstructor 204 that subsequently accepts the modified frequency domain representation of the image 206 and returns the enhanced output image 210.

In one embodiment, the deconstruction phase is performed only once on the identified image and the unmodified frequency domain representation retained. Thus, only the frequency domain representation modification and reconstruction phases need to be performed for most user adjustments during still photo editing, thereby improving performance.

In one embodiment, frequency domain representation modification is performed entirely in the reconstructor. For clarity, the following description presumes that to be the case, although it is not strictly necessary to do so.

Use of Programmable Unit Interval Transforms for Controls

In various exemplary embodiments, the UFTE is configurable to provide Programmable Unit Interval Transforms (PUITs) for both transform parameters and user interface controls. For example, PUITs can be utilized by one or several of the deconstructor 202, the frequency domain representation modification, and the reconstructor 204 to perform various functions as described below.

In one embodiment, the UFTE performs a plurality of PUITs where an input value in the unit interval domain (0≤x≤1) is mapped to an output value in the unit interval range (0≤y≤1) by one or more of a plurality of programmable functions. For example, the input value may be mapped to an output value by a simple linear function, a quadratic, a third order polynomial spline, or even higher order polynomial.

In another embodiment, a PUIT is used to perform additional functions utilizing a Look Up Table (LUT) to approximate any arbitrary function and a LUT can be used on floating point data using linear or cubic interpolation of adjacent points in the LUT. In another example, utilizing a graphics processing unit (GPU), a texture can be used to contain multiple LUTs selectable by row and where the interpolation is performed by the GPU's texture addressing interpolator.

In one embodiment, a PUIT is used to perform mathematical functions, such as gamma curves or other logarithmic or exponential functions, or trigonometric functions such as sine or cosine to map from input to output values.

In another embodiment, a PUIT is used to perform topological functions where a selectable slice of a surface is used as the mapping function.

In another embodiment, a PUIT is used to perform functions where a temporal domain variable "t" is used as an input variable, which is especially applicable for dynamic video effects.

In another embodiment, a PUIT is used to perform functions having multi-dimension domain variables; (e.g. f(x,y), or f(x,y,z)). For example, the domain variables are defined as geometric domain variables, where a location in the image can be used as an input.

In yet another embodiment, a PUIT is used to perform functions using a monochromatic image plane for the PUIT input values. For example, the plane is generated by a user using "airbrush" like controls or computed values in existing or future image processing programs.

In another embodiment, a PUIT is used to perform functions where an arbitrary domain interval from a<b is converted arithmetically into a unit interval domain by the transformation $y=(x-a)/(b-a)$ on input values x.

In another embodiment, a PUIT is used to perform functions where the unit interval domain may itself be piecewise and recursively subdivided into a plurality of domains, each mapped arithmetically into a unit interval domain and multiple cubic sections may be used to generate a smooth curve, where the polynomial coefficients used in each subsection are calculated by cubic spline interpolation methods to provide a complex and highly adaptable output function.

In another embodiment, a PUIT returns a sub-PUIT as the result of a domain input. When this domain input value falls exactly at a sub-PUIT point, the sub-PUIT is then evaluated to determine the output value for that input. When the input value falls between two sub-PUIT points, then both sub-PUITs evaluated and the final output value interpolated between the two sub-PUIT outputs. When the domain input value falls between a defined sub-PUIT and a defined non-sub-PUIT output, then the defined output and the sub-PUIT out are interpolated.

In another embodiment, a PUIT is used to define an interpolation method between two sub-PUITs.

In another embodiment, and especially on a GPU, the interpolation between two PUIT or sub-PUIT functions is accomplished by using the GPU hardware to interpolate between two adjacent LUT rows on a texture. Further, a single texture may contain the data for a plurality of PUITs, where each row of the texture contains a single PUIT's LUT values. In another example, this functionality may be implemented using DSP, FPGA, or discrete hardware technology.

In another embodiment, LUT values for a PUIT with a plurality of domain inputs may be approximated by a texture (as in a GPU) with a plurality of dimensions.

In another embodiment, pixels and other component parameters may be mapped to the unit interval.

In yet another embodiment, the UFT may process pixels as having three components (Y, U, V), but it may be convenient or advantageous to retain and process the data as four components, especially on a GPU. The additional channel may be referred to as an auxiliary channel that can store convenient information during the UFT process, such as by example, the original unenhanced luma value of the pixel. If an auxiliary channel is not practical, an auxiliary plane may be used instead, where the elements of the plane may be a single or a plurality of channels.

In various exemplary embodiments, the use of PUITs as a generalized control and user interface (UI) mechanism provides an extreme degree of control, implementation convenience by design reuse, and uniformity of user interface, and for scaling user control values.

UFT Provides Frequency-by-Frequency Pyramid Based Operation

In an exemplary embodiment, a plurality of images are maintained at each frequency level of an image pyramid data structure. For example, each frequency level of the image pyramid data structure maintains a difference image or Frequency Isolation Image (FII), and a multipurpose working data and frequency level output image.

In practice a user may encounter a wide variety of image sizes. Since the UFT may require parameters to be set for each frequency, and the number of frequencies is dependent on the image size, a means for a user to manipulate controls independent of image size may be implemented. In one embodiment, the frequency level indices may be normalized over the unit interval; for example, 0.0 may correspond to the highest resolution frequency of the pyramid, and 1.0 may correspond to the lowest resolution frequency of the pyramid. The frequencies in between may be divided over the unit interval. In another embodiment, frequency-based controls may then be controlled by PUITs.

Figure 10:
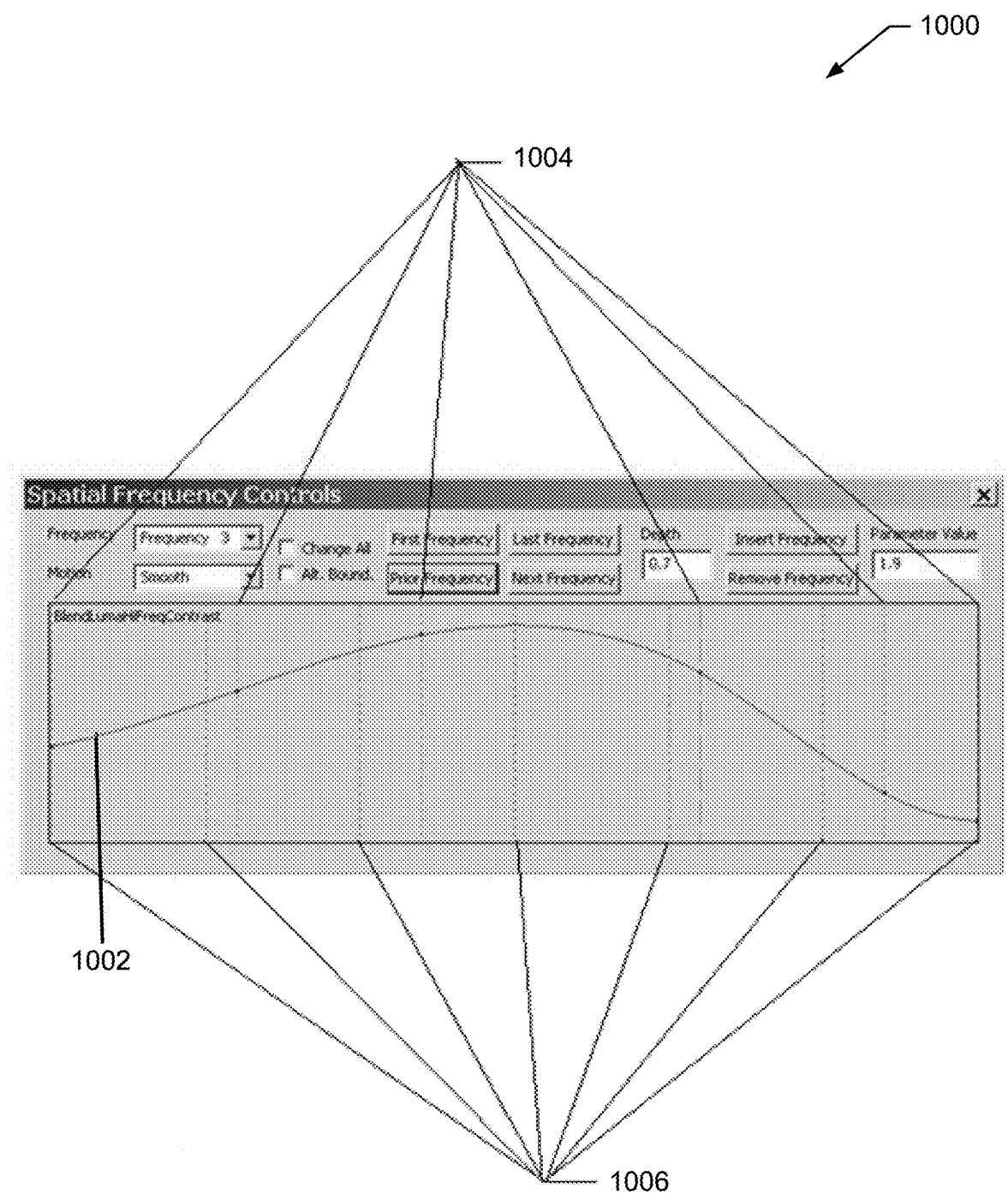
FIG. 10 shows an exemplary embodiment of a unit interval transform with a plurality of intervals in accordance with the exemplary embodiments.

FIG. 10 shows an exemplary embodiment of a programmable unit interval transform (PUIT) 1000 used as a user interface over the frequency domain with a plurality of intervals in accordance with the exemplary embodiments. The x-axis is the frequency range from highest (left) to lowest (right), normalized over the unit interval. In this case the number of frequency levels 1006 is seven, but varies with the size of the selected image. The y-axis is the PUIT output value 1002, in this case an aggregate contrast factor (ACF) high frequency contrast control. There are six control points 1004 in this case to control the shape and output values of the PUIT curve. These are set by the user and do not vary with the size of the image.

The Deconstructor

In an exemplary embodiment, enhancing the identified image utilizing the UFT may include enhancing the identified image utilizing one or more algorithms (e.g., UFT algorithms, etc.). In another embodiment, one or more UFT algorithms may run in a recursive manner. For example, a UFT algorithm may run from a highest resolution level to a lowest resolution level, and vice versa.

Figure 3:
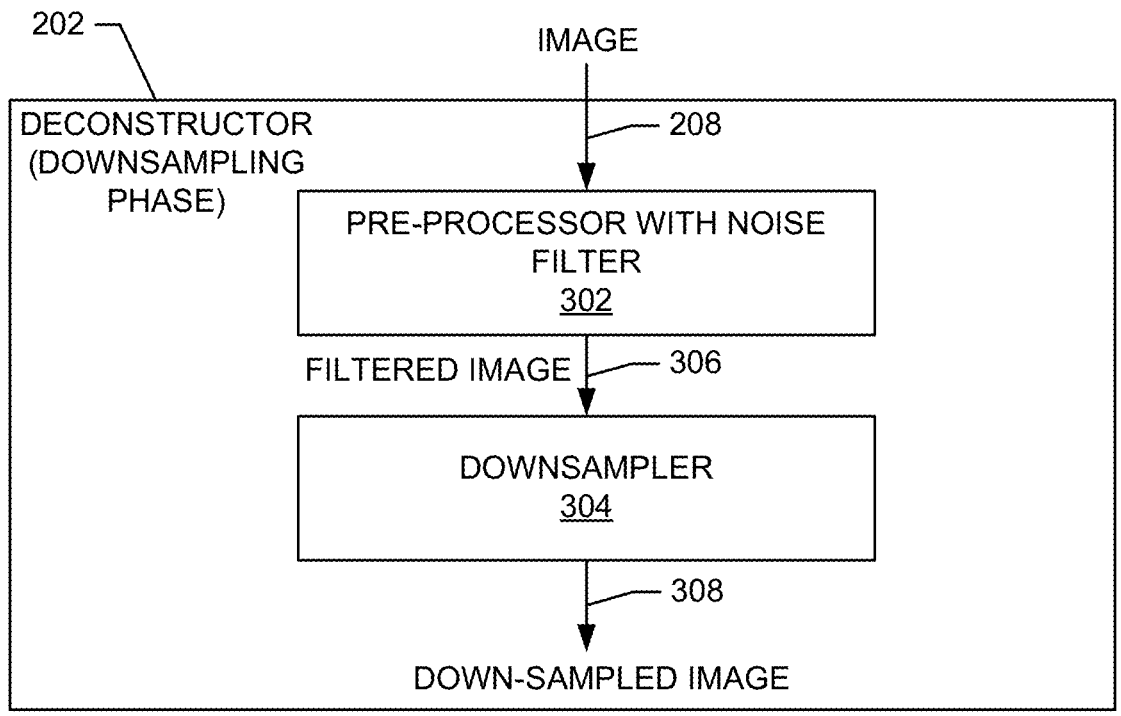
FIG. 3 shows an exemplary embodiment of a deconstructor operating in a downsampling phase.

FIG. 3 shows an exemplary embodiment of the deconstructor 202 comprising a pre-processor 302 with a noise filter such as a bilateral, guided, or non-local-means filter, and a convolutional or bilateral downsampler 304 that operate in a downsampling phase. In an exemplary embodiment, the deconstructor 202 operates in two passes, first running from a highest resolution level to a lowest resolution level (downsampling phase) performing noise filtering and downsampling operations. For example, these operations are performed by the pre-processor with noise filter 302 and the downsampler 304, respectively. Then, in a reverse pass running from a lowest resolution level to a highest resolution level (upsampling phase discussed below), performing the upsampling and differencing operations to create the frequency isolation image (FII). For example, these operations are performed by an upsampler and a difference generator.

In one embodiment, the pre-processor 302 includes a LUT operator and/or computational equivalent and/or interpolating geometric addressing manipulator to perform computations on the input data, particularly on the highest frequency level.

In an exemplary embodiment, when running from a highest resolution level to a lowest resolution level, the UFT algorithm downsamples a current image to create an input image for the next lower resolution level. Additionally, in an exemplary embodiment, the pre-processor 302 with noise filter applies noise filtration prior to downsampling to generate a filtered image 306. In another embodiment, the downsampler 304 performs bilateral downsampling to generate the downsampled image 308.

In one embodiment, the convolutional or bilateral downsampler 304 has variable convolution coefficients. In another embodiment, the convolution coefficients for a 3×3 filter may be chosen with the center one being 0.25 and the others automatically adjusted in proportion to their distance from the center. In another embodiment, the coefficients may be chosen with the center one being 0.25, the edges being 0.125, and the corners being 0.0625. In another embodiment the coefficients may be further modified based difference in value between the center pixel and pixel value corresponding to each coefficient; i.e., a bilateral filter. In another embodiment, the downsampler 304 may larger than 3×3, e.g. 5×5, with coefficients chosen for better rejection of harmonics. In another embodiment the downsampler may use more sophisticated resampling techniques.

Figure 4:
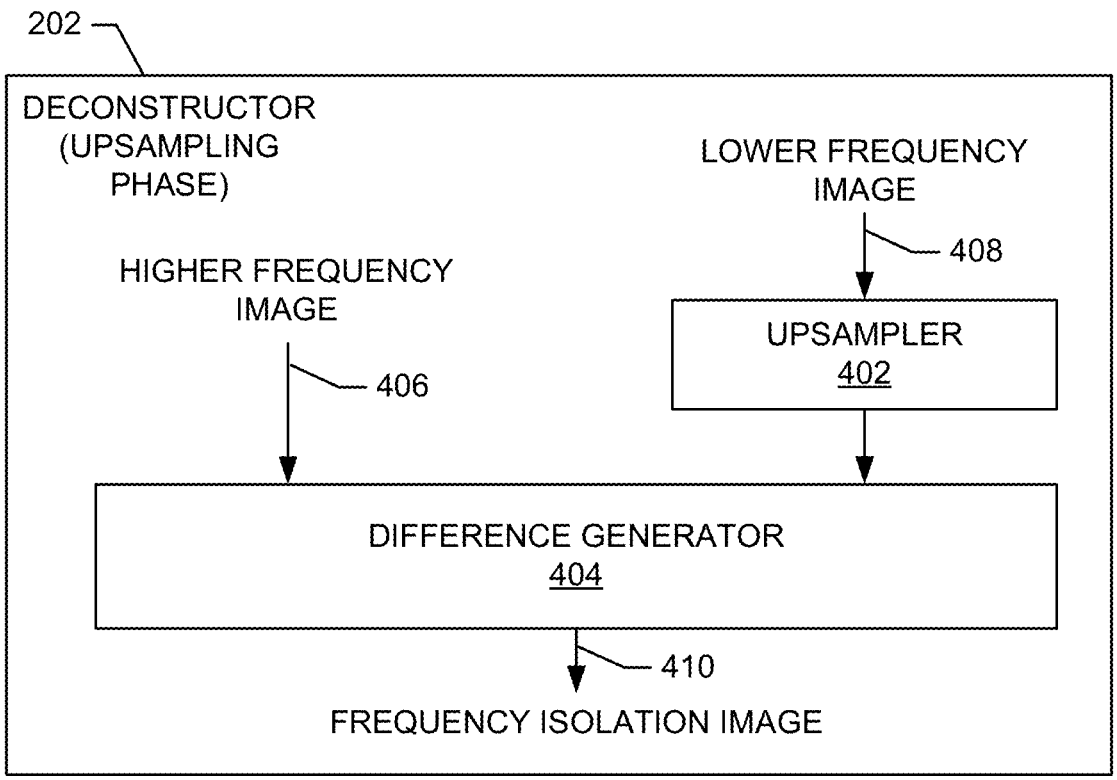
FIG. 4 shows an exemplary embodiment of a deconstructor operating in an upsampling phase.

FIG. 4 shows an exemplary embodiment of the deconstructor 202 comprising an upsampler 402 and a difference generator 404 that operate in an upsampling phase. In one embodiment, the upsampler 402 may include a conventional 2D interpolating upsampler and/or the upsampler 402 may include a bi-cubic upsampler or other upsampling technique which may include a larger area of support for better rejection of harmonics and noise. In one embodiment, the deconstruct or 202 in the upsampling phase may run at each level of a processing pyramid, receiving a higher frequency image 406, and a lower frequency image 408, and producing a Frequency Isolation Image (FII) output image 410. In an exemplary embodiment, the UFT algorithm upsamples the lower frequency's downsampled image back up to create an upsampled image. The combination of downsampling and upsampling data creates a lower resolution image in the higher frequency's sampling domain or image dimension. In another embodiment, the pixel-by-pixel differences between the original image and down/up sampled lower resolution image at a given frequency level may be then computed and stored along with the original luma value in an auxiliary channel or plane. This output is the Frequency Isolation Image (FII) 410. For example, in an exemplary embodiment, the deconstructor 202 operates to perform a downward pass that operates on a plurality of levels of the pyramidal data structure on a sequential frequency-by-frequency basis from higher to lower frequency to downsample at each level to generate a lower resolution downsampled image and a residue image at the lowest level. The deconstructor 202 also operates to perform an upward pass in a sequential frequency-by-frequency basis from lower to higher frequency to upsample the lower resolution downsampled image to generate an upsampled image. The deconstructor 202 further operates to perform subtracting the upsampled image from the downsampled image for each frequency level of the pyramid to generate a frequency isolated image for each pyramid level to produce a frequency-based spatial domain representation.

In another embodiment, the inclusion of the differences calculation in the FII and retention of the original luma allows reduction of the number of image buffers used by UFT, permits the later use of neighborhood operations, such as a bilateral, directly on the differences plane as an integral part of the blender rather than a separate computational pass, and may constitute a significant improvement over prior art, and allows color saturation adjustment based upon the amount of luma or contrast change in the enhanced image.

Since the lowest frequency does not have a lower frequency to upsample to create an FII, it is represented only by the downsampled image at the lowest frequency or what is referred to as the Residue Image.

In an exemplary embodiment, the collection of the Frequency Isolation Images and the Residue Image constitutes a spatial frequency domain representation of the selected image.

The intent of the difference generator 404 is to isolate the Nyquist frequency for each frequency level FII, and if perfect, then subsequently running the downsampler on the FII would produce a "tuning plane" that is minimal. In one embodiment, the quality of the downsampler/upsampler combination may be checked and tuned by computing the tuning plane and evaluating its closeness to zero. An FII value may be considered a non-separable, 2 (or N) dimensional representation of the Nyquist frequency content at that point.

In its simplest and most unadorned form the FII may superficially other pyramids, but the intent is different in ways that affect the deconstructor's design. Other pyramids were originally developed as a compact image code useful for image compression and having downsampling filters that removed more than the Nyquist frequency was not necessarily harmful. If fact, if they improved the compressibility of the data they could be helpful. Such filters are detrimental for the deconstructor, though. By removing more than the Nyquist frequency they cause lower frequency harmonics to bleed into the FII image for that level, and bleed out the FII images in levels below. This impairs the precision of orthogonal frequency control at each level. In an exemplary embodiment, the downsampling filters in the downsampler are tuned to best remove the Nyquist frequency and only the Nyquist frequency, while leaving lower frequency content intact.

In another embodiment, a mapping operation is performed on the input data for gamma manipulation, color balance, and global tonemapping such as by use of a LUT or other mechanism. In another embodiment, this operation may be efficiently performed on the input to the deconstructor pre-processor 302 with bilateral or other noise filter for the highest frequency level, and the original luma data stored in an data channel (or plane) for the original luma, so the effect of the luma changes of the LUT operation may be later comprehended in the gamut and saturation correction calculations in the reconstructor 204. In this exemplary embodiment, the downsampling operation in the deconstructor also downsamples this auxiliary channel or plane so that the original luma values can be propagated properly through the various frequency levels.

In another embodiment, a multi-function bilateral may combine these operations in such a way that each function may be selectively turned off or on.

The Reconstructor

Figure 5:
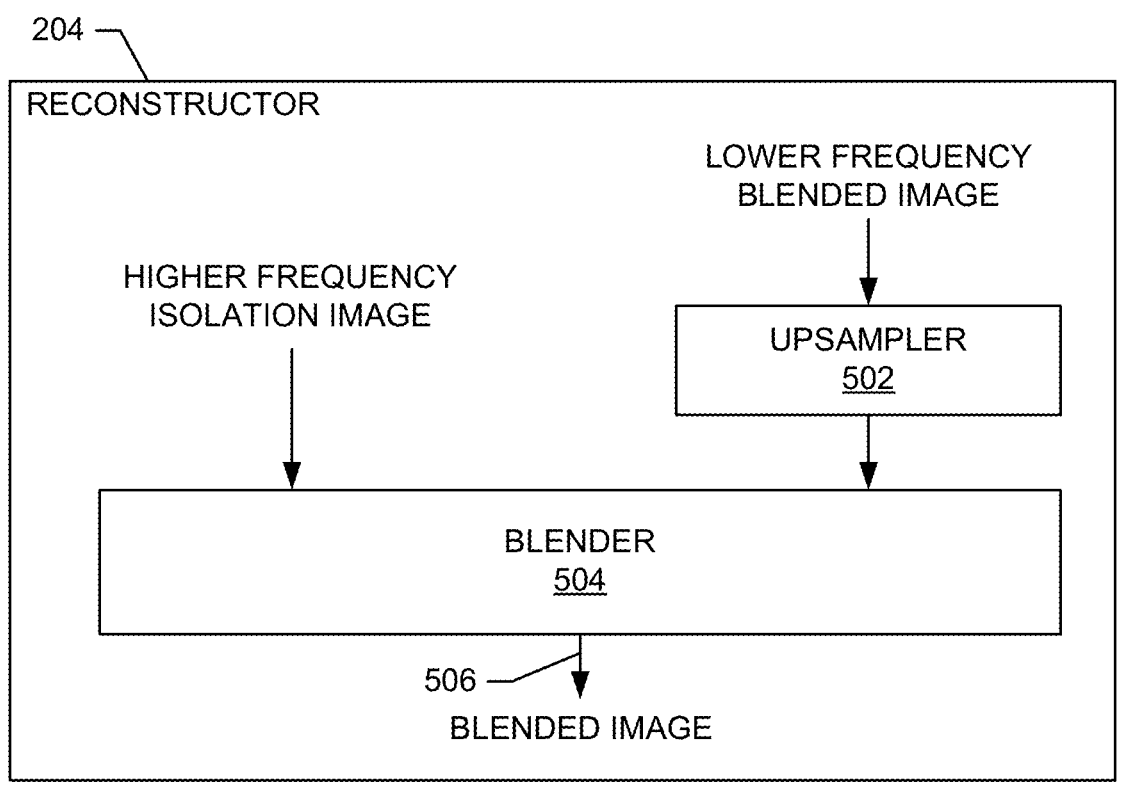
FIG. 5 shows an exemplary embodiment of a reconstructor that includes an exemplary embodiment of a frequency blender.

FIG. 5 shows an exemplary embodiment of the reconstructor 204. In an exemplary embodiment, the reconstructor 204 comprises an upsampler 502 and a blender 504. In one embodiment, the upsampler 502 may include a conventional 2D interpolating upsampler and/or the upsampler 502 may include a bi-cubic upsampler or other upsampling technique which may include a larger area of support for better rejection of harmonics and noise.

Figure 6:
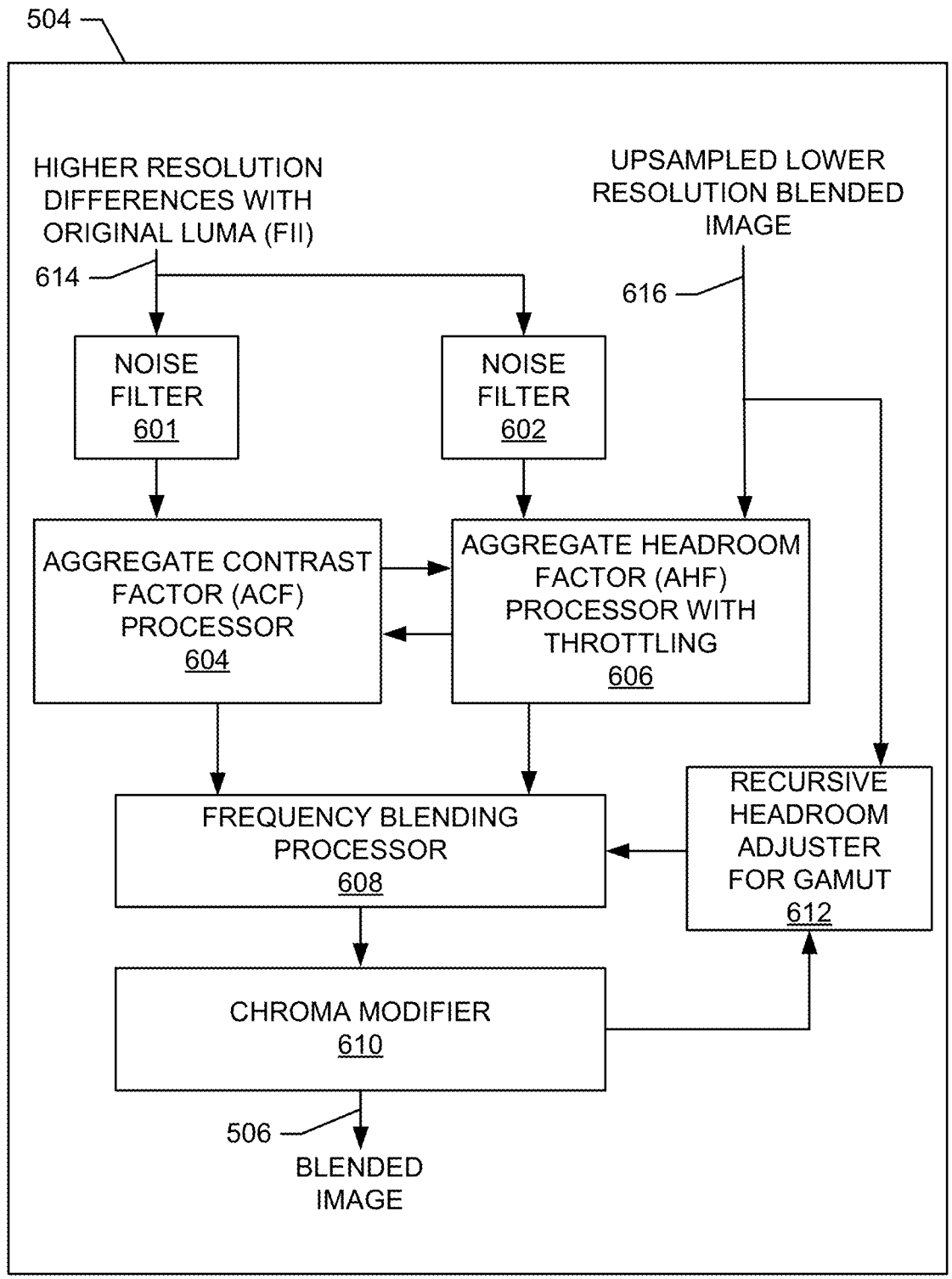
FIG. 6 shows an exemplary detailed embodiment of the frequency blender shown in FIG. 5.

In an exemplary embodiment, when running from a lowest resolution level to a highest resolution level, the UFT algorithm may upsample the lower resolution's blended output image 506 (or at the lowest resolution, the Residue Image) using the upsampler 502 to create a resampled image 616 (shown in FIG. 6). In another embodiment, each frequency level's FII (614) is blended with the previous level's upsampled blended output 616 (shown in FIG. 6) by the blender 504 to generate a blended output image 506. For example, in an exemplary embodiment, the reconstructor 204 operates to perform an upward pass on the frequency-based spatial domain representation in a sequential frequency-by-frequency basis from lower to higher frequency to produce a blended output image at each frequency level. In an exemplary embodiment, the reconstructor 204 produces the blended output image at each frequency level by: upsampling the lower frequency's blended output image or the residue image to generate an upsampled image; modifying the frequency isolated image for each pyramid level to generate a modified frequency isolated image; modifying the upsampled image for each pyramid level to generate a modified upsampled image; blending the modified frequency isolated image for each pyramid level with the modified upsampled image to generate an blended output image at each pyramid level for input to the next higher frequency level; and returning a highest resolution blended output image as the enhanced image.

While the frequency domain representation may be modified between the deconstruction and reconstruction phases, in another exemplary embodiment it is advantageous that these modifications are performed on-the-fly, frequency-by-frequency, as part of the reconstruction phase in a manner that preserves the frequency domain data representation unaltered for repeated processing with revised, and/or updated control parameters.

In another embodiment, the reconstructor 204 provides the deconstructor's upsampling phase that is performed on-the-fly, frequency-by-frequency, as part of the reconstruction phase.

Operation of the Blender During Reconstruction

FIG. 6 shows an exemplary detailed embodiment of the frequency blender 504 shown in FIG. 5. In an exemplary embodiment, the reconstructor 204 includes the blender 504 to perform blending of the accumulated results of lower frequency processing with higher frequency data on a frequency-by-frequency basis and may use a pyramid design. In an exemplary embodiment, the blender 504 operates during the reconstruction phase at each frequency level to perform multi-frequency contrast enhancement, local tone-mapping, noise filtering, gamut management, and with frequency-based dynamic headroom management while minimizing halos or gradient reversal. Starting with the residue image, the reconstructor operates on a frequency-by-frequency basis from lower to higher, and uses the blender combine the previous level's output result or residue with the next higher frequency's FII and blend them together with increasingly higher spatial frequency results.

In an exemplary embodiment, the blender 504 computes an Aggregate Contrast Factor (ACF), which may be computed from a plurality of factors, to multiply with an input FII value 614. The blender 504 also computes an Aggregate Headroom Factor (AHF), which may be computed from a plurality of factors, to multiply with an input resampled value 616 that is upsampled from the lower frequency's blender output and scaled around a fulcrum value. That is, the fulcrum value is subtracted from the resampled value 616, then multiplied by the AHF, and then the fulcrum is added back in. Typically, the fulcrum is midpoint of the pixel range, but may be varied by the user or as described elsewhere. These two outputs are then summed to produce the output blended value 506.

In an exemplary embodiment, the blender 504 comprises an Aggregate Contrast Factor Processor (ACFP) 604 to compute and use the Aggregate Contrast Factor (ACF). The blender 504 also comprises an Aggregate Headroom Factor Processor (AHFP) 606 to compute and use the Aggregate Headroom Factor (AHF).

In one embodiment, the blender 504 computes a nominal pixel brightness value as extracted from the resampled image or the original luma value retained in the auxiliary channel or plane or by other computation and may be further modified by a PUIT. The method used to compute the pixel brightness value may vary depending upon its usage.

In one embodiment, within the ACFP one factor of the ACF may vary based on the spatial frequency (or level in the pyramid) and this factor may be controlled by a PUIT. The ACF also may include a factor that varies based on the nominal pixel brightness value and this factor may be controlled by a PUIT. Since the brighter part of halos tend to be more noticeable in darker areas and the darker part of halos in brighter areas, the ACF may be further modified based on the sign of the difference value as well as the nominal brightness of the pixel. These controls may be separate for positive and negative FII values and be controlled by PUITs. Since these bright/dark halo issues are more noticeable in flat areas this positive/negative handling may be reduced gradually as the FII values increase. The ACF may be further modified by a noise reduction factor computed by thresholding the absolute value of the FII value between low and high thresholds modified by a PUIT. The thresholds may vary based on pixel brightness and controlled by a PUIT. The output of the ACFP is a modification of the frequency domain representation, as are some of the internal computations described. For focus considerations the ACF may also be modified as described in other sections below.

Because the addition of the ACF modified high frequency contrast component can cause dynamic range excursions in the blended value, in another exemplary embodiment, the dynamic range of the input resampled image 616 is controlled and reduced by the AHFP by subtracting a fulcrum value, multiplying by the AHF (normally unity or less in this example), and then adding back the fulcrum value, creating headroom. This is a throttling function to control dynamic range. One factor of the AHF may vary based on spatial frequency (or level in the pyramid) and this may be controlled by a PUIT. The AHF may vary based on the pixel brightness value and this may be controlled by a PUIT. Since headroom is only desirable where it is necessary because there is a high frequency signal, and otherwise undesirable in flat areas of bright or dark, the AHF may be modified by a throttle factor by thresholding the absolute value of the FII value between low and high thresholds to reduce headroom where differences are small or zero. To reduce mottling the FII values may be noise filtered by bilateral or other types of filters (this is a modification of the frequency domain representation) or access and upsample a lower resolution's FII prior to thresholding. Also, since throttling is most needed in light or dark areas, a PUIT control may be applied to the pixel brightness value and used to adjust throttling. For gamut control the AHF and its headroom and throttling components may also be modified as described in other sections below. Also, the ACF may be used to adjust the color saturation based on the change in contrast introduced by applying the ACF.

In another exemplary embodiment, an AHFP 606 may also exercise dynamic fulcrum control when multiplying the input resampled value, that is, the pivot point about which contrast is amplified or attenuated. In images with broad flat areas, such as sky in an aircraft photograph, the blender 504 may spatially adjust the fulcrum values to the broad flat brightness values for halo mitigation or to maintain brightness references, either by user control or by computation. Additionally, the fulcrum may vary automatically from a high level in bright areas to a low level in dark areas to help mitigate halos and preserve highlight and shadow references. Further, the fulcrum values may be saved and retrieved spatially in an auxiliary channel, and as the reconstructor 204 traverses the pyramid, the blender 504 checks the FII values and where the frequency content is below a threshold, the blender 504 biases the fulcrum value towards the resampled luma value, and saves the new computed fulcrum value for use in the next frequency level.

In another exemplary embodiment, an AHFP 606 may also exercise dynamic headroom control when the absolute value of the amplified FII value is so great that when applied to the input resampled value 616 it would cause a dynamic range excursion. In this case it may increase the headroom by further reducing the fulcrum-managed contrast value applied to the input resampled value 616 and it may adjust the fulcrum values as well based on the resampled pixel value and may be controlled by a PUIT.

In an exemplary embodiment, the action of the blender 504 may be used in way loosely analogous to a Guided Filter, but is fundamentally superior for many reasons. In this analogy, the FII would be represented by the "guide image" and the input resampled image would represent the "filtering input." The Guided Filter uses a box filter which gives poor frequency control. By contrast the frequency representation of the UFT provides very precise and independent controls at various spatial frequencies. For noise reduction this allows different noise thresholds to be used for different frequencies, which is important as the noise component decreases as the spatial frequency decreases. This is very important in reducing lower frequency chroma mottle. While the Guided Filter box filter can be implemented very efficiently on a CPU using area summing techniques, building the required integral image is more problematic using some highly parallelized engines, such as a GPU. Furthermore, the blender 504 with its headroom and throttling components and gamut methods provides much more sophisticated methods than described in the Guided Filter, along with much more precise control in the frequency domain.

Thus, in various embodiments, the blender 504 may run at each level of a processing pyramid, receiving a Frequency Isolation Image (FII), a resampled image, and producing an output image. In another embodiment the blender 504 may take the FII input, run a bilateral filter 602 or other noise filter to reduce the effect of noise, and use it for auto headroom and throttling calculations to compute a headroom adjustment AHF. In another embodiment, the blender 504 may take the upsampled lower frequency (resampled) output and modify it based on the AHF producing a lower frequency component 610. In another embodiment, the blender 504 may take the FII input or a bilaterally processed or otherwise noise filtered form of these differences output from filter 601 and compute and apply the ACF for contrast amplification and noise thresholding 604 before blending with the processed lower frequency component 614 to produce the frequency blending output. The two noise reduction stages may be performed independently with separate controls.

In one embodiment, the blender 504 may include a spatially variant chroma modifier 610. In another embodiment, the chroma modifier 610 may be an optional element of the UFT engine. In another embodiment the chroma modifier 610 may detect out-of-gamut conditions in the frequency blending output, and may adjust the pixel values to mitigate the out-of-gamut condition and/or recompute the headroom adjustment 612 and other parameters and reprocess the frequency blending output with newer parameters (not shown). In yet another embodiment, the UFT engine 200 may work on images in a YUV or other type of luma/chroma color space.

Use of Bilateral Filters and Variants

In an exemplary embodiment, the UFTE may utilize bilateral filters and variants, such as a bilateral sharpener and preprocessing of input data with a multi-function bilateral resampler (not shown) or other noise filters. In one embodiment the UFT may perform bilateral filtering during either or both of the deconstruction and/or reconstruction phases. Furthermore, an N×N bilateral filter may be used during the processing of each level of the image pyramid data structure.

In one embodiment the blender 504 comprises the noise filter 601 such as a bilateral or non-local-means filter to perform filtering on the Frequency Isolation Image (FII) 614 frequency data.

As an additional improvement, noise filtering may be employed prior to the downsampling of each image in the deconstructor in order to filter at the earliest possible stages and assure that only the highest quality data is subsequently processed. As a further improvement, the threshold values used by the bilateral may be controlled by PUITs.

In another embodiment, a full bilateral filter may be simplified in useful ways, such as a box bilateral where all pixels in the area of support have equal distance weighting, rather than Gaussian, or with simplified value thresholding, such as can be approximated more efficiently, for example, by a cubic spline.

In another embodiment, the UFT processes use a bilateral sharpener, which combines bilateral weighting adjustments to the conventional coefficients of a convolutional filter nominally used for sharpening. Unlike a conventional bilateral these bilateral weights may instead be used to exclude similar values and include ones with greater differences.

Since the deconstructor's 202 noise filter 302 for the highest frequency level is the first operation performed, it may be a convenient place to perform pre-processing operations. In one embodiment, since the bilateral filter is by nature a spatial resampler, geometric corrections such as lens distortion correction and lateral chromatic aberration correction may be performed concurrently by adjusting input sampling coordinates for the bilateral, especially on systems where address interpolation is performed by hardware such as on a GPU.

It will be apparent to those with ordinary skill in the art that other types of noise filters or resamplers may be substituted instead of the bilateral and its variants.

Other Component Parts

In an exemplary embodiment, the UFTE comprises one or more components that assist in performing image enhancement. For example, in an exemplary embodiment, the UFTE includes a downsampler that may include a 3×3 or N×N symmetrical kernel convolution with one or more variable coefficients. In another embodiment, each of the one or more variable coefficients may be assigned a predetermined value, and/or may be adjusted according in proportion to a distance from another coefficient. In another embodiment, a bilateral downsampler may be used, with each of the one or more variable coefficients is further adjusted on the basis of a value difference between the input data at that coefficient's point and the center point data value. The sum of all these data points are divided by the sum of the final coefficients, as in a bilateral filter, to achieve bilateral downsampling for improved edge-awareness. As a further improvement, the threshold values used by the bilateral may be controlled by PUITs.

Further still, in another exemplary embodiment, the UFTE includes an upsampler. For example, the UFTE may include a two-dimensional (2D) bilinear interpolating or N×N upsampler, or a bi-cubic interpolating upsampler. The upsampler produces an upsampled image. The upsampler may be used in both the deconstruction and reconstruction phases.

In another exemplary embodiment, the UFTE includes a blender. For example, the blender runs during reconstruction at each frequency level of a multi-level data structure. In another example, the blender may receive a Frequency Isolation Image (FII) and an upsampled or resampled image that is the output of the next lower frequency level's blender. In yet another embodiment, the blender produces an output image utilizing the input. Also, in one embodiment, the UFTE includes a bilateral filter to operate on the FIT. Also, in one embodiment, the UFTE includes a chroma adjuster. For example, the chroma adjuster runs as a post processor. In another example, the chroma adjuster is spatially variant.

In addition, in one embodiment, enhancing the identified image utilizing the Unified Frequency Transform may include enhancing the identified image utilizing one or more data structures. For example, the UFT engine may utilize an image pyramid data structure. In another example, the image pyramid data structure may include a plurality of levels (e.g., frequencies, etc.). In yet another example, each level within the image pyramid data structure may have a portion of the resolution of the previous level (e.g., half the resolution, etc.).

Further still, in one embodiment, each level of the image pyramid data structure may have its own set of controls. In another embodiment, a workbench of user controls may be used to manipulate level controls. In yet another embodiment, a control converter may be used to translate user controls into level controls. In yet another embodiment, these user controls may be offered by PUITs, thereby providing great flexibility and control, while allowing the same underlying PUIT User Interface implementation to be reused many times. In another embodiment, user controls may be converted into PUITs for algorithm control.

Spatially Localized Tonemapping

For an image having a long dimension N, deconstructing the image down into a pyramid of log 2 N frequencies may convert its representation into the spatial frequency domain. Each frequency may control twice the frequency of the lower resolution frequency. Low frequency components may represent the illuminant portion of the image. Reducing the illuminant portion of the image may allow greater range for amplifying the higher frequency components, which correspond to the reflectant portion of the image. This may be included as a basic function of local tonemapping. Because human contrast sensitivity is reduced at low spatial frequencies, as described later and shown in FIG. 12, a moderate loss of low frequency contrast might not be too noticeable. However, low spatial frequencies are also used by the visual system as 3D and contour cues, as described later and illustrated in images 1606 vs. 1602. For example, reducing the low frequency component (illuminant) can result in a perceptual three-dimensional "flattening" of the overall image where good visualization of gradual contours and depth are impaired or lost. For such reasons, images processed by just conventional means alone may be susceptible these and other artifacts, gradient reversal, and to halos.

Also, earlier methods attempting to reduce halos may be very computationally intensive and may lack a degree of spatial frequency control.

In one embodiment, the blender 504 may at each frequency level reduce or augment the contrast of the lower resolution input at the lower frequency levels to reduce or augment the contrast of lower frequencies and then add this result into the amplified and noise filtered difference (FII) values. This controls the relative contrast ratio between frequency levels.

However, reducing the contrast of lower frequencies may create an artifact in areas that lack higher frequency information. For example, broad areas of black or white may become gray. In an exemplary embodiment, the blender 504 uses an Aggregate Headroom Factor Processor (AHFP) 606 to remove or control this artifact in a manner that may be much more computationally efficient than earlier methods and with superior, more natural results. Where the unamplified, noise filtered, high-pass component is less than a certain threshold, the headroom for the contrast applied to the upsampled lower frequency blender output image can be spatially attenuated based on a PUIT control.

Figure 16:
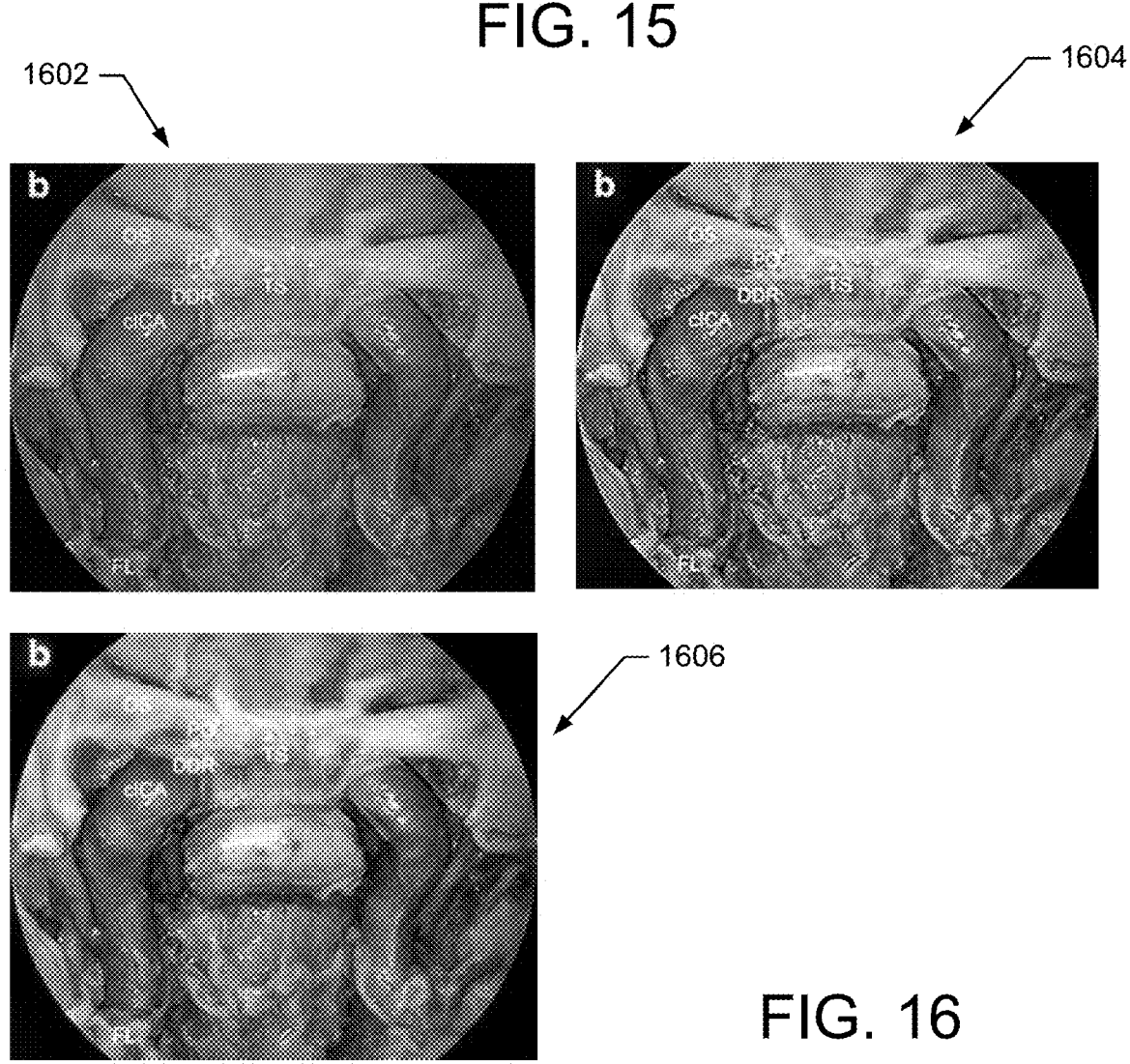
FIG. 16 illustrates two different results of applying a Unified Frequency Transform with different settings to an unadjusted medical image in accordance with the exemplary embodiments.

In another exemplary embodiment, contrast at lower spatial frequencies can even be amplified overall, except as needed spatially to keep the dynamic range within bounds. This may result in an overall improvement of visualization of gradual contours and perceptual depth cues, enhancing rather than impairing a three-dimensional sense of depth. In yet another exemplary embodiment, the programmable controls allow the amplification of only the relatively lower spatial frequencies, achieving the improvement of visualization of gradual contours and perceptual depth cues but without modifying the visual details of the image. FIG. 16 images 1602 (before) and 1606 (after) are illustrative.

In an exemplary embodiment, the blender 504 uses an Aggregate Headroom Factor Processor (AHFP) 606 to spatially accommodate the amplified contrast. Where the unamplified, noise filtered, high-pass component is greater than a certain threshold, the contrast (reduction) factor applied to the resampled input image can be attenuated based on a PUIT control. Additionally, in another embodiment, the AHFP may also adjust the fulcrum value around which the value of the upsampled lower frequency blender output image is multiplied, increasing it in brighter areas and decreasing it in darker areas, under PUIT control. As described, the AHFP may modify the contrast and fulcrum values applied to the upsampled lower frequency blender output image regardless of whether the contrast control value is amplified or attenuated. The AHFP may also directly manipulate the ACF as well. This allows blender to rely on the AHFP for dynamic range control for all contrast values selected by the user.

In another exemplary embodiment, the Aggregate Headroom Factor Processor (AHFP) 606 may access upsampled data from a lower frequency's FII image for headroom information, estimation, and computations.

In another embodiment, local tonemapping the headroom adjustment is emphasized in the lower frequency frequencies, to normalize the illuminant, and progressively neutralized to a very small amount in the higher frequency frequencies. Throttling may be performed only where headroom adjustment is emphasized in the low frequency levels and not in the high frequency levels. Contrast may amplified in all spatial frequencies, and may vary over different spatial frequencies depending on the effect or enhancement desired.

In another embodiment, to improve halo suppression, an edge detection algorithm may be run on either or both of the FII image or lower frequency upsampled input image, the edge values multiplied by a user controlled positive or negative factor, and added to the blender output.

Increased high-pass contrast in the highest pass frequency may act like conventional image sharpening, (e.g., a convolutional filter or unsharp mask). However, since contrast may be increased at all frequencies, the result may include a multi-resolution sharpening. As a result, the image may appear sharpened regardless of resizing or the viewing distance. This is in contrast to conventional sharpening, which only operates at the highest spatial frequency, and may lose its effect when downsized or viewed from afar. This method of the UFTE is also less susceptible to halo artifacts or ringing.

In another exemplary embodiment, an image may be broken down into more than 2 N frequencies with less than a factor of 2 between frequencies to achieve fractional frequency control.

Effect of Luma Tonemapping on Chroma Perception

In conventional systems, luma operations may change the apparent saturation in a spatially variant manner. In yet another exemplary embodiment, the chroma modifier 610 is used to mitigate this change. For example, the chroma modifier 610 compares an enhanced luma value with the original luma value in the auxiliary channel and adjusts the chroma saturation based on this brightness difference adjusted by a control. In still another exemplary embodiment, normal tonemapping is performed on the luma component and chroma is adjusted corresponding to the luma change.

In one embodiment the amount chroma saturation adjustment based on the brightness difference is controlled by a PUIT.

Chroma Thresholding

Since the two chroma values (e.g. U and V by example) are interrelated it may be advantageous to combine them for determining a threshold that is then applied to both values, such as for chroma noise filtering. In one exemplary embodiment, when determining the threshold distance between two chroma values, where du is the difference between U components and dv is the difference between V components, the formula [sqrt (du*du+dv*dv)] is used to compute the value to be used for thresholding. In another exemplary embodiment, since the noise level may differ with color, especially inasmuch as there are often twice as many green pixels as blue or red in the sensor, an elliptical envelope may be used instead of a circular one where the minor axis is aligned with the green axis. In another exemplary embodiment, radial distance may be modified by a PUIT where the input domain is the hue angle normalized to the unit interval allowing highly controlled envelopes to be used, especially where the spectral noise distribution varies due to the relative analog and digital gains, which may vary dynamically to correct for changes in color temperature.

Chroma Tonemapping for Saturation and Chroma Edge Enhancement

While local tonemapping may be performed on the luma component, it may also be advantageous to perform the same type of operation on the chroma planes as well. First, applying the noise reduction filter directly may be effective in reducing chroma noise. Second, by providing some chroma difference increase in the top few frequencies, the boundaries of sharp chroma changes may become more perceivable by the eye, which may enhance the perception of edges, especially as the human eye is less adept at perceiving chroma differences spatially as it is luma. According to some studies it may also increase the perception of color saturation. This may be additionally helpful with images affected by the use of color space domains such as YUV422 of YUV420 where the spatial chroma resolution has been compromised.

In another embodiment, a local tonemapping operation is performed on the chroma values to enhance chroma edges for better perception of saturation, to reduce chroma noise below a threshold, and to mitigate the de-saturating effects of chroma noise reduction.

In medical imaging, color changes in tissue may be diagnostically informative, and in some cases these color variations may be subtle. In another embodiment, chroma local tonemapping and multi spatial frequency color contrast enhancement may be used to amplify the chroma component to enhance the appearance of color changes in a multi-frequency manner for better visualization.

Mixed Illuminant Mitigation

In an exemplary embodiment, the local tonemapping functionality, with its ability to separate the illuminant from the reflectant, may be used to achieve mixed-illuminant color correction by spatially biasing the mixed illuminants in the lowest frequencies of the pyramid to neutral gray. Furthermore, in another embodiment, those values at the lowest frequencies may be biased towards some other selected background color, whether chosen by the user or derived from some algorithmic method. For identifying situations with broad color biases, such as colored walls, this bias may be slaved to a more sophisticated color temperature identification function, such as identifying color light regimes by comparing sample points to known lists of outliers for all likely color temperatures.

In another exemplary embodiment, the use of bilateral downsamplers in the deconstructor 202 and bilateral sharpeners in the reconstructor 204 can be used to provide improved edge awareness and an improvement over conventional systems.

Since many mixed illuminant situations involve color temperature variations, in another embodiment, the low frequency chroma restriction are selectively emphasized much more along the blue-yellow color axis than along a green-magenta or red-cyan axis, or along conventional color temperature pathways.

Dynamic Gamut Management

In one embodiment, simple gamut limits may be placed on the chroma components based on limiting the radial chroma component values to limit saturation.

In an exemplary embodiment, dynamic gamut management is provided using local texture estimation and blender headroom with throttling (the AHFP) to spatially mitigate gamut excursions.

A common problem in conventional systems is that an image that has been acquired or processed in a luma/chroma color space must be converted to an RGB or other color space, and in the process the conversion produces color values that are illegal or out of range in the destination color space. This can be especially problematic in bright gradations with constant hue such as blue sky around the sun. It is also common problem that the processing of originally legal color values itself can cause the enhanced color values to go out of range or out of gamut in a later colorspace conversion.

Typically, four methods of gamut correction called rendering intents have been used, namely; absolute colorimetric, relative colorimetric, perceptual and saturation rendering intents. No single method works well in all cases. In practice, photographers mostly use either relative or perceptual intents, but vary between them on a case-by-case basis.

Typically, in smooth areas with little detail such as blue sky it is preferable to preserve color and hue over luma (brightness) to abate undesirable color changes. However, if the area contains detail then clipping luma results in clipping detail, and preserving luma becomes more important, and usually preserving hue over saturation is desirable to reduce the effects of color shifts.

In an exemplary embodiment, the blender 504 examines the absolute value of the FII values to determine the amount of local detail or texture at that frequency. In another embodiment, the filter 601 operating on the FII may be used to reduce the effect of noise on this examination.

In yet another embodiment, the enhanced pixel in the blender 504 may be temporarily converted to an output color space to examine if the enhanced pixel components create an out-of-gamut condition, and if so, the degree of out-of-gamut. In yet another embodiment, the acceptable nature and degree of out-of-gamut detection may vary by frequency level, controlled by a plurality of PUITs.

In another embodiment, if an out-of-gamut condition is detected, the AHF factor is modified so that the amount of headroom may be increased and/or the throttling decreased to adjust local luma values so as to reduce out-of-gamut artifacts, the degree of which may be subject to a PUIT control. This is gamut correction by local tonemapping.

In another embodiment, if an out-of-gamut condition is detected, the luma range may be restricted, the degree of which may be subject to a PUIT control. This is gamut correction by brightness restriction and may be best for bright gradations with constant hue such as blue sky around the sun.

In another embodiment, if an out-of-gamut condition is detected, the saturation range may be restricted, the degree of which may be subject to a PUIT control. This is gamut correction by saturation restriction and may be the best for areas with local detail or texture that needs to be preserved.

In yet another embodiment, the blender 504 may utilize all three of these methods of gamut correction in a balanced coordinated way. The use of gamut correction by local tonemapping is better for lower frequencies, so the amount of gamut correction by local tonemapping may be controlled by a frequency level PUIT. In another embodiment, the remaining amount gamut correction can be varied between brightness and saturation restriction methods based of the amount of local detail or texture as examined in the method already described above and controlled by a PUIT.

In yet another embodiment the pixel may be reprocessed by the blender 504 using new parameters adjusted by the gamut correction parameters selected.

In some examples it may be desirable to perform only LUT operations on an image, but existing methods are vulnerable to the gamut problems described above. In another embodiment a UFT may be used as a more sophisticated gamut corrector, with or without performing other operations. In another embodiment, to enhance the speed of the UFT, the differencing pass may be removed from the deconstructor 202 and instead the differencing may be performed on the fly in the blender 504 during reconstruction, at the expense of giving up some processing options on the FII in the blender 504.

Because gamut management and correction can be smoothly spread over multiple spatial frequency levels the spatially blended result is more natural and less vulnerable to artifacts than existing methods. Performing dynamic gamut management at lower frequencies by adjusting luma improves the image quality by allowing more headroom for higher frequency image content, especially for preserving texture, without compromising saturation.

In another embodiment, existing local tonemappers may be modified to include gamut considerations in their low frequency luma adjustment; however, because of the smooth multiple spatial frequency nature of the UFT it is the preferred embodiment.

Brightness, Color, and Saturation Control Using the Residue Image

Many image editing systems have brightness and color controls, but suffer from the problem of driving highlights and shadows out of range so they become clipped, and bright colors out of gamut creating artifacts. In another embodiment these brightness and color controls may be applied instead to the residue image to alleviate these problems by letting the AHFE throttling reign in luma and color within limits as the image is reconstructed, frequency by frequency in a naturally smooth and spatially blended manner. The residue image is the lowest resolution image in the pyramid and contains the DC component of brightness and color, and so, in another embodiment, applying brightness, color, and saturation changes equally to all pixels in the residue image is equivalent to applying the same to all the pixels in the highest resolution image after reconstruction, except for the ability of the blender to spatially and smoothly restrain such effects within parameter limits to avoid unwanted clipping and gamut excursions.

Dodging and Burning in the Frequency Domain

Many image editing systems have dodging and burning controls using variable opacity keys to control the effect on an area of interest. In another embodiment, dodging and burning may be done in the frequency domain, with correspondingly sized areas of interest and control values at varying levels of the pyramid. By performing dodging and burning in this manner not only is the effect more controllable in the frequency domain, but it can take advantage of the AHFE automatic headroom adjustment and gamut management to automatically mitigate clipping-related and out-of-gamut artifacts prevalent in other methods.

Radial Image Corrections

Earlier methods may use various compensations for radial image degradations such as optical light fall-off and lens shading. In one embodiment, the various control parameters may be modified at each point in an image by taking the radial distance from the center and mapping the value through a PUIT to calculate the adjustment for said parameter.

In another embodiment, a PUIT may be represented spatially by a surface for cases where radial symmetry is insufficiently uniform.

Control Limitations

In an exemplary embodiment, some controls may be limited by a fixed number of frequency levels rather than by an image size compensating frequency PUIT. For reasons of physics, there are a few controls that should not be managed by an image size compensating frequency PUIT. For example, the nature of multi-frequency noise reduction is dictated by the size of the pixels on the sensor, rather than the number of pixels on the sensor. Subsequently, in one embodiment, the depth of bilateral filtering in the deconstructor 202 as well as noise thresholding in the reconstructor 204 may be limited to a specified number of frequency levels from the highest frequency.

For another example, mixed illuminant mitigation may be primarily done at only the lowest frequencies of an image, regardless of how high resolution the image actually is. Accordingly, in another embodiment mixed illuminant mitigation controls may be limited to a specified number of frequency levels from the lowest frequency, an improvement over conventional systems.

Frequency Morphing

In another embodiment, the frequency domain representations of a plurality of different images may be blended by the blender, and may be blended by different amounts at different frequencies to achieve a frequency morphing effect. These may be blended by blending the FIIs and/or the lower resolution blender inputs. In another embodiment, in the time domain, a plurality of stills or video streams may be frequency morphed with the frequency blending factors varying over time to achieve a frequency morphing transition.

UFT and Focus

Typically, a camera system of known geometry, such as focal length, aperture, and calibrated focusing mechanism (where a known focus mechanism setting corresponds to a known focus distance, and vice versa) that is used to capture a given object that lies at a known distance from the focal plane then the size of the circles of confusion may be calculated for various degrees of out-of-focus. If the size of the circle of confusion is known and the plane of focus is known then it is possible to calculate that the object is in one of at most two known distances from the plane of focus. In one embodiment, the FIIs may be used to estimate the size of the circle on confusion at a point. For a given point, a focus profile may be calculated by interpolating a difference value at that point for each level of the FII pyramid. No interpolation is needed at the highest level. If at the highest frequency level, the focus profile value is high compared to noise then the image may be considered to be in focus at that point. If not, and the next frequency down the focus profile is high compared to noise then the circle of confusion may be considered to be twice the pixel size, and if not and the next frequency down the focus profile is high compared to noise then the circle of confusion may be considered to be four times the pixel size, and so on. A circle of confusion that is between two levels in size may have a reduced magnitude above noise at the higher level. In this manner it is possible to estimate the size of the circle of confusion.

In an exemplary embodiment, in a system of known geometry and calibrated focusing mechanism, the estimated circle of confusion may be used to estimate one of at most two possible corrected planes of focus. In some situations, such as at or close to infinity there may be only one possible solution. In other situations, other clues may be used to disambiguate the likely corrected plane of focus from the other solution. Either way, this may be used as a hint has to how far to move the focus mechanism in order to optimize the speed of the focusing.

In another exemplary embodiment, a sub-image window or plurality thereof may be used by the UFT for zone focusing, and such zones may be guided by external mechanisms, such as by example, a face recognizer.

In another exemplary embodiment, a database of focus settings, hints, and actually verified correct new focus settings, as well as other relevant data, may be maintained and used by a Computer Learning method to improve and optimize hint generation, both generally as well as in specific end-user devices.

In another exemplary embodiment, a defocus effect may be achieved by reducing the values in the higher frequency FIIs to obtain a focus profile to match a desired circle of confusion. Furthermore, by only partially attenuating the higher frequency FIIs a soft focus effect may be simulated.

In another exemplary embodiment, defocus effects may be controlled in a spatially variant manner, and if the distance at each point in the input image is known or estimated by the methods above then that may be used to compute a focus profile at each point that is used to control the defocus effect.

Lower Processing Cost of Lower Pyramid Levels, Hybrid Method

All other factors being equal, about seventy-percent of the processing resources are consumed at the highest level of the pyramid and about ninety-percent by the highest two levels. In another exemplary embodiment, the UFT may increase the processing sophistication at lower pyramid levels with minimal effect on overall processing burden but may provide significant improvement in halo, gradient reversal, and other artifact reduction.

At a given frequency level, the downsampled image of the deconstructor 202 and the resampled (upsampled) image of the reconstructor 204 may be considered the unprocessed and processed images for that level respectively. Therefore, in another embodiment, a Hybrid method is used where the UFT offloads the unprocessed downsampled image for a level to an arbitrary computational component, program, or algorithm and inputs the processed output as the resampled image for that level. This Hybrid method allows the use of more sophisticated but more computationally intensive local tonemapping or other algorithms. For example, these algorithms include Edge Aware Wavelets or Domain Transform, or including future algorithms, to work in the frequency domains at which they are still very effective, but at greatly decreased computational cost since the higher levels are processed by the more efficient UFT.

Conversely, in another exemplary embodiment, a faster, suitably designed pyramid-based processor, such as the less capable Hyper-Clarity Transform by example, may pass a lower level input image to the UFT and receive a processed image for that level in return, in a similar hybrid manner, or more generally, any suitably designed pyramid-based arbitrary computational component, program, or algorithm, may at a sub-level engage and substitute a different arbitrary computational component, program, or algorithm, more appropriate to the reduced computational cost of the lower levels, increased computational cost of the higher levels, and for a plurality of such interfaces.

In another exemplary embodiment, where emulation of human perception is desired, reconstruction complexity in the highest frequency layers may be reduced spatially in areas away from the image center to reduce the processing resources required.

Generalization to N Dimensions and Arbitrary Parameters

While the above examples have illustrated the use of the UFT on 2 dimensional optical images, in another embodiment the UFT may be extended by induction to a plurality of dimensions, wherein the pyramid image buffers are N-dimensional and the UFT components; deconstructor, reconstructor, blender, bilaterals, bilateral downsamplers, convolutions, upsamplers, etc., are extended into a plurality of N dimensions as well, including N=1.

While the above examples have by example illustrated the use of the UFT on color pixel data with 3-pixel value components, in another embodiment the UFT is applied to data groups having a plurality of N individual component parameters as well as a plurality of N dimensions. Just as the controls of the two chroma components are linked in the above examples, in another embodiment, pluralities of components may be linked together with common controls, and threshold radii and other control parameters may be calculated in a plurality of dimensions.

Also, while some of the examples cited herein may employ functions that are among prior art in 2D imaging, their extension into a plurality of dimensions and component channels, especially with non-visual parameters, may constitute a novel embodiment.

By example much of the following illustrative discussion describes luma operations but may be applied to other parameters. In some 3D and higher dimensions a transparency value may be used. In these examples, care must be taken to prevent slightly transparent values from going fully transparent and disappearing, or at the other end of the spectrum, to prevent values with little transparency from going fully opaque and obscuring other structure. In another embodiment the blender 504 in a multi-dimensional UFT may check input transparency values for non-fully transparent or non-fully opaque conditions and may further adjust headroom adjustment and throttling and/or restrict output values to prevent them from becoming fully transparent or opaque, or to preserve full transparency or opacity, especially for alpha channels.

Similar to transparency, in another embodiment, the data may contain reflectivity values and the blender 504 in a multi-dimensional UFT may check input reflectivity values for non-reflectivity or full reflectivity conditions and may further adjust headroom adjustment and throttling and/or restrict output values to prevent them from becoming completely non-reflective or fully reflective.

In another embodiment, a 3D UFT may be used in volumetric data to help visualize such features as gradients, membranes, surfaces, and textures.

In another embodiment, a UFT may improve the visualization and identification of low frequency gradients and shapes, and may be used, by example for enhancing pressure or thermal gradients, or by improving the visualization and identification smooth shapes with diffuse boundaries. In another embodiment, a UFT may be used to accentuate multi-dimensional structures with specific spatial frequency signatures in size or boundary, while suppressing other characteristics that are not of interest.

In another embodiment, any number of components may represent parameters other than visual inputs, and may include by example and not by limitation: pressure, density, mass, velocity, gravity, temperature, humidity, molecular and elemental composition, concentrations or ratios, energy, half-life, transparency, opacity, diffusion; electrostatic or electromagnetic potential, force, flux, or charge; population or demographic characteristics, statistical likelihoods, as well as any other varying parameters and which may or may not be mapped to the unit interval.

In another embodiment, a multidimensional local tone-mapping function may be applied to high dynamic range parameters for better visualization in limited dynamic range environments.

In another embodiment, the dimensions in a coordinate system may be other than Cartesian such as polar coordinates or hybrid combinations and may be used, by example in ranging devices such as ultrasound, sonar, radar and Doppler radar.

In another embodiment, an N dimensional UFT enhanced database may use the mapping of dimensional parameter values into false color representations for functional imaging for highlighting characteristics of interest.

In another embodiment, the Hybrid method is used with an arbitrary external computational component, program, or algorithm such as by example the Domain Transform that is itself extended or adapted to a plurality of dimensions and/or arbitrary parameters. The benefits of such a Hybrid method increases with the number of dimensions; for example, in 3D about 85% of the processing is done at the highest level only In yet another embodiment, a multi-dimension extension with an arbitrary number of component parameters may substitute a simplified or alternative pyramid based clarity enhancing method.

In yet another embodiment, some arbitrary parameters may have fixed maximum or minimum limits in a manner analogous to chroma and gamut limitations, and methods analogous to gamut controls, including adjusting local tone-mapping coefficients in a manner similar to gamut correction by local tonemapping or residue image brightness and color controls may be employed to keep them within limits.

In yet another embodiment, when filtering using non-local-means (NLM) filters in N dimensions, the match vectors within a plane and between planes may be retained and reused between multiple planes to reduce recalculations and to help guide and minimize search areas. By way of example, consider the video case where the time is the third dimension in a series of frames. Besides performing NLM within a frame, it is desirable to search adjacent frames for suitable matching regions as well. Such match vectors between an earlier image and a later one may be used in both directions in time where a plurality of images are used in the NLM domain. Series of vectors from image to image to image may be followed and used as hints to minimize search areas through a chain of images. In another embodiment, the inter-image and intra-image NLM vectors may be generated when an image first appears in the NLM domain and inter-image vectors retained until the previous image is retired from the NLM domain, and the intra-image vectors retained until its image is retired from the NLM domain. In another embodiment, these techniques may be generalized to N dimensions and arbitrary parameters.

Optimization of Memory and Cache Usage

In many modern systems, memory cache performance may be a significant and even limiting factor and this may be greatly influenced by data locality.

Figure 11:
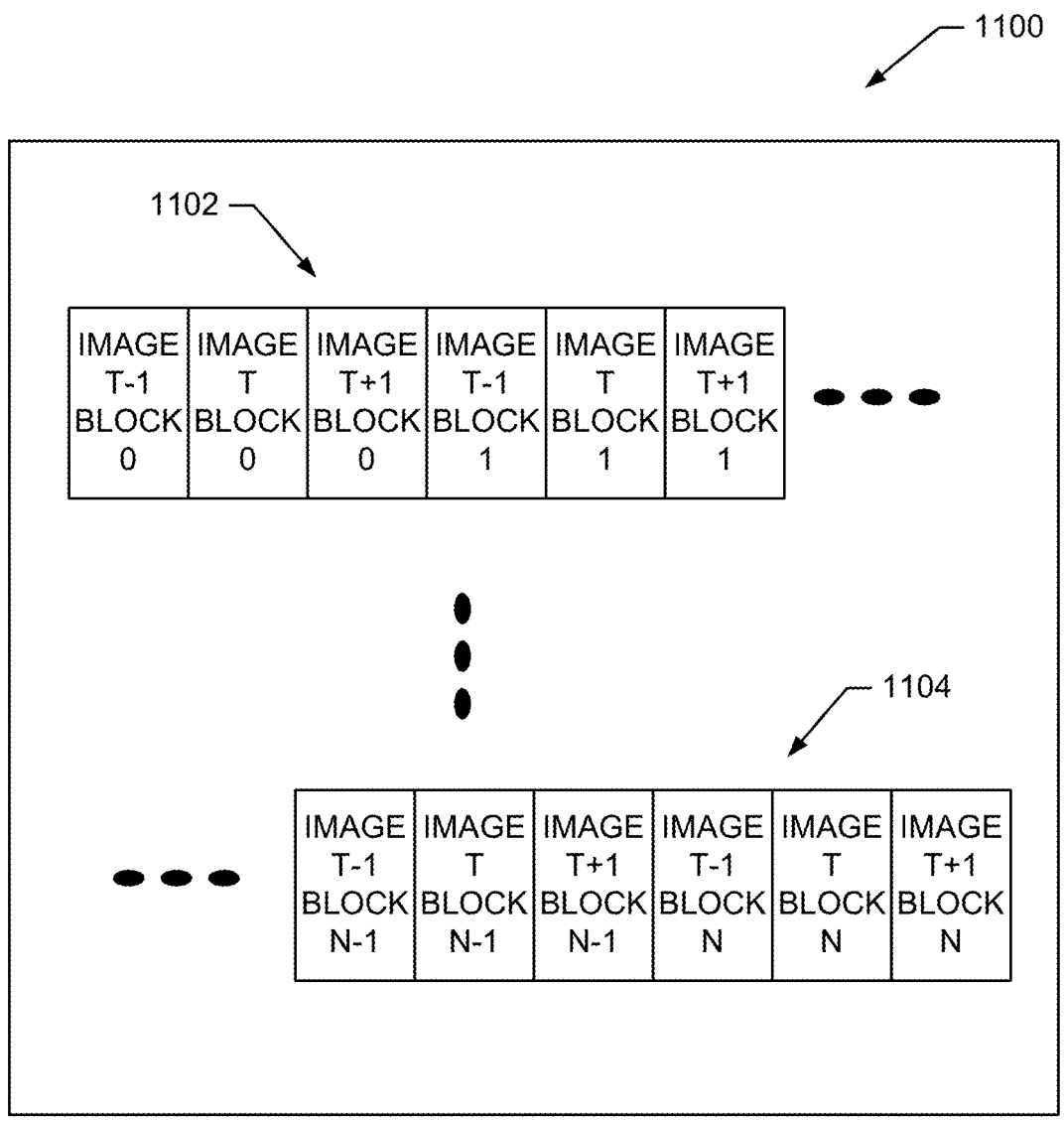
FIG. 11 shows an exemplary embodiment of 3D pyramid data interleaving in accordance with the exemplary embodiments.

FIG. 11 shows an exemplary embodiment of 3D pyramid data interleaving. In another embodiment, where 3D data is processed (such as video data where the 3rd dimension is temporal) the image data may be interleaved in one of the dimensions to improve cache locality. For example, a 3-way interleaving of the image data (for images T−1, T0, T+1, etc.) may interleave a small portion of T−1 data may be followed by T0 data, followed by T+1 data, and the interleaving repeated for the total amount of data of the three images. The size of the interleaved amounts may be adjustable; as small as a pixel in one embodiment, the size of a cache line in another embodiment, or yet another convenient size in yet another embodiment. When a fresh new image comes in it replaces the locations in the interleaving by the oldest image.

In another embodiment, a plurality of images may be so interleaved. In yet another embodiment the interleaving may be extended by induction to images or data sets of a plurality of dimensions.

In yet another embodiment, tiling and block linear data locality techniques may be used to improve data locality, and may be used in combination with the above techniques.

Example Applications

In one embodiment, enhancing the identified image utilizing the Unified Frequency Transform can be included as a plug-in or part of a still picture editing program. In yet another embodiment, the image may be part of a video stream, such that video UFT and local tonemapping may be performed. In another embodiment, enhancing the identified image utilizing the Unified Frequency Transform can be included as a plug-in or part of a video editing program.

In yet another embodiment, enhancing the identified image utilizing the Unified Frequency Transform can be performed for video games as a post-rendering graphics processing unit (GPU) pass to apply the UFT and local tone mapping to achieve increased apparent dynamic range and clarity. In still another embodiment, enhancing the identified image utilizing the Unified Frequency Transform may be embedded in a system on a chip (SOC) for inclusion in one or more of a television and a monitor to apply to one or more of broadcast, playback, and video game inputs.

Further, as shown in FIG. 1, operation 106, the enhanced image is returned. In one embodiment, the enhanced image is returned to a user or application that submitted the image for processing. In another embodiment, returning the enhanced image includes outputting the enhanced image to a display, sending the enhanced image to a database or other data storage device, etc.

Further still, as shown in operation 102, the identified image may be a 3D volumetric or other N-dimensional database, and as shown in operation 106, the enhanced image returned is a 3D volumetric or other N-dimensional dataset database upon which UFT has been applied.

In another embodiment, enhancing an identified image that is a 3D volumetric or other N-dimensional database utilizing the Unified Frequency Transform is performed to enhance feature and shape discrimination in a CT or MRI database, or a database for geology (such as seismology derived databases and resource mapping), ground penetrating radar, oceanography, topology, biological micrography, light field microscopes, depth maps, or 4D databases such as weather models (spatio-temporal such as GeoMesa) for visualizing pressure gradients, wind-shear, laminar flow, fluid dynamics, weather fronts, terrain mapping, 5D plenoptic function and 4D light field (especially for glare reduction), visualizing cellular membranes and structures, molecular representations, statistical quantum visualizations, crystalline visualizations, enhanced x-ray visualization of ventricles and valves with or without use of contrast material (such as amplifying time-interval-differencing techniques), telemetry analysis, visual effects, cosmology, including the visualization Doppler-based localized motion within red-shift generated 3D model of the cosmos, or in enhancing the differential visualization overlying structures at different distances by using the amount of red-shift as a dimension, ranging such as sonar, radar, and Doppler radar using Cartesian or polar coordinate processing, parametric and function data representations.

In another embodiment, the UFT may be performed on synthetically modeled data as well as actual measured data.

In another embodiment, the UFT may be performed in a plurality of places in a data processing flow, and is performed in different numbers of dimensions or other characteristics in each place. For example, consider a weather radar system where a radio ray is emitted and echoes are acquired over time. Especially in weather radar the targets are semi-transparent to the rays, so there may be several echoes over time. The acquired data is therefore a 1 dimensional signal in the time domain. A single dimension UFT is performed on the acquired echo return signal for each ray to reduce noise and enhance differentiation of atmospheric boundaries, and especially to enhance low frequency structures. Subsequently, if the acquired radar data is processed into a 2 or 3 dimensional database, that database itself can be enhanced by a multidimensional UFT to further reduce noise from a different processing perspective, as well as differentiate atmospheric boundaries, stratifications, and gradients, and especially to enhance low frequency structures and relationships, Further, if the database is 3D for example, viewpoint projections can be generated which are conventional images, and these can be further enhanced by a 2D UFT. If the viewpoint moves, creating a sequence of views, then this stream can be further enhanced by a UFT in a manner analogous to UFT processing of a video input. In each different data domain in such a processing flow, the enhancement by a UFT may work in a different way from the UFT in the other domains such that they are complimentary to one another. Other examples of such multi-UFT processing include ultrasound, sonar, ground penetrating radar, or seismic data.

There is great interest in applications that perform panorama stitching of several overlapping photos into a single composite photo. The blending at photo boundaries is often done by matching high frequency characteristics in common between the component images. This method may create discontinuities in the low frequencies components of the stitched images. In another embodiment, this blending is done by blending the spatial domain representation of the component images on a frequency layer by layer basis, and then the final blended image reconstructed from the blended pyramid. By induction, this method can be extended to stitching together N-dimensional databases with improved continuity.

Conventional photographic printing often involves selective exposure—dodging, burning and masking—of the projected image during exposure. In another embodiment, UFT may be used to design and print a set spatial frequency masks or dodging implements that can be used in the optical path during otherwise conventional photographic printing.

Also, regardless of whether it performs any other processing or not, in another embodiment, UFT may be used to input an unprocessed image along with a version of the same image that has been processed by an external program or tool, subtract the two, apply a signed contrast factor, add an offset adjustment based on the lowest pixel value and output the result to be employed as a photo mask used in the optical path during conventional photographic printing, to impart the effects of the external or internal manipulation to the end result of the conventionally printed resulting image.

Conventional medical x-ray imaging systems may suffer from excessive dynamic range when imaging certain anatomy, especially the chest due to the large air spaces. X-ray attenuating materials may be used in the x-ray path to help reduce this. In another embodiment, UFT may be used to design and print using a 3D printer a spatial frequency based x-ray attenuating "phantom" to be placed in the x-ray path during exposure.

Architectures

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 7:
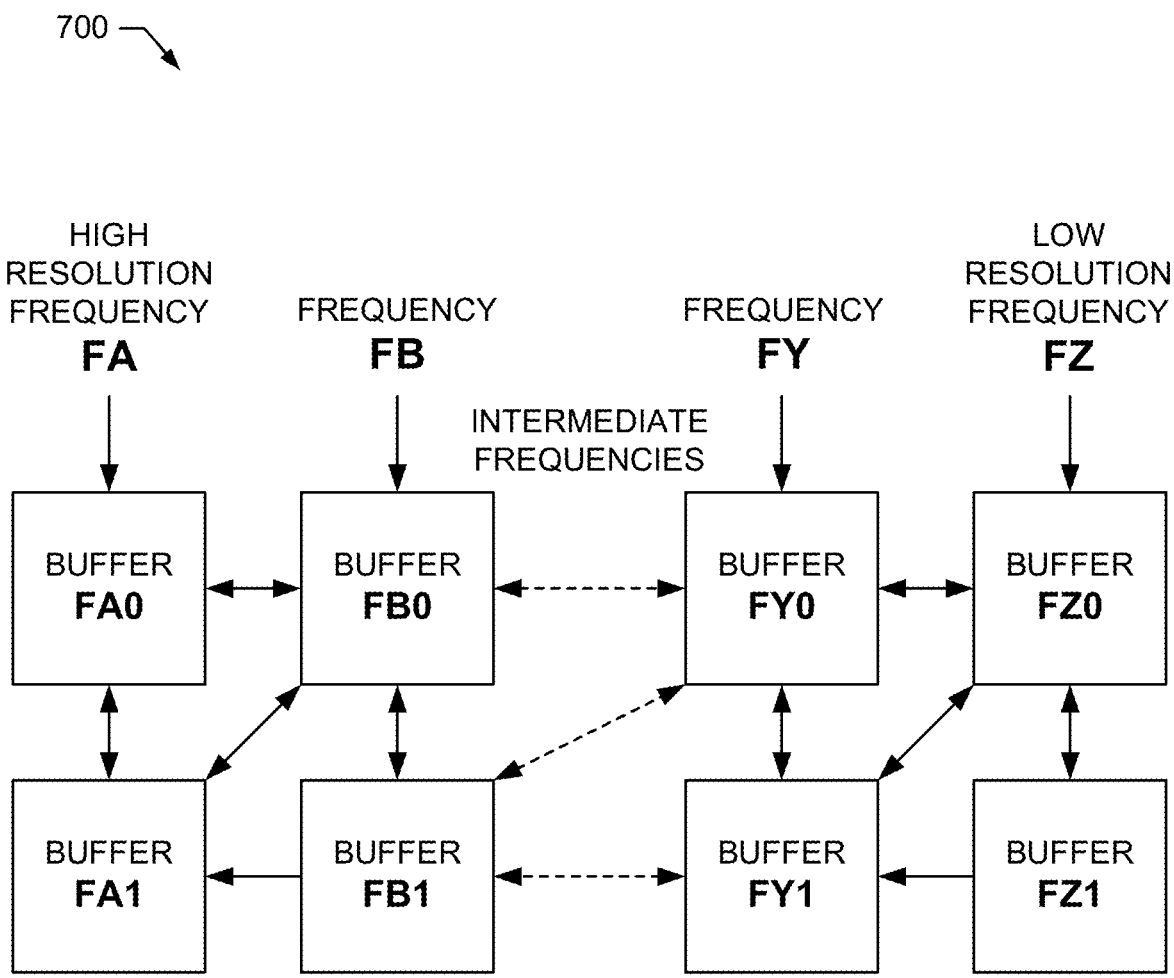
FIG. 7 shows an exemplary embodiment of an image pyramid data structure for use with an exemplary embodiment of a Unified Frequency Transform Engine.

FIG. 7 shows an exemplary embodiment of an image pyramid data structure for use with an exemplary embodiment of a Unified Frequency Transform Engine. As an option, the processing pyramid 700 may be carried out in the context of the functionality of the exemplary embodiments. Of course, however, the processing pyramid 700 may be implemented in any desired environment. In an exemplary embodiment, enhancing the identified image utilizing the Unified Frequency Transform includes enhancing the identified image utilizing one or more data structures. For example, in an exemplary embodiment, the UFTE utilizes the image pyramid data structure 700. In another embodiment, the image pyramid data structure 700 includes a plurality of levels (e.g., frequencies, etc.). In yet another embodiment, each level within the image pyramid data structure 700 has a portion of the resolution of the previous level (e.g., half the resolution, etc.).

Further still, in one embodiment, each level of the image pyramid data structure 700 has its own set of controls. In another embodiment, a workbench of user controls is used to manipulate level controls. In yet another embodiment, a control converter is used to translate user controls into level controls. In yet another embodiment, these user controls may be offered by PUITs, thereby providing great flexibility and control, while allowing the same underlying PUIT UI implementation to be reused many times. In another embodiment, the user controls are converted into PUITs for algorithm control.

As shown, the processing pyramid 700 includes a plurality of frequencies FA-FZ. Each level represents a frequency. In one embodiment, the processing pyramid 700 may access a data structure to perform UFT operations. For example, a main data structure may include an image pyramid where each frequency level of the pyramid has half the resolution of the previous level. In another embodiment, two images may be maintained at each level: a Frequency Isolation Image (FII), and a multipurpose working/output image. In yet another embodiment, each frequency level of the pyramid may have its own set of controls. Additionally, a workbench of user controls may be employed to allow easier manipulation of the frequency controls; a control converter may perform this translation. PUITs may be used in these implementations, especially the frequency controls.

Additionally, in one embodiment, the processing pyramid 700 may include one or more algorithms. In another embodiment, the one or more algorithms may run in a recursive manner. For example, an algorithm of the processing pyramid 700 may run recursively from the highest resolution level to the lowest, and then the algorithm of the processing pyramid 700 may rewind back again. In the forward direction the algorithm may downsample the current input image to the next lower resolution level's input image, then upsample it back to create an upsampled (lo-res) image. In the backwards direction the algorithm may upsample the lower resolution level's output image to create the resampled image. The deconstructor runs in both directions, creating the FII at each level. The reconstructor runs in the backwards direction running the blender functions for each level. In another embodiment, some algorithms on some architectures may require that output images not also be input images, and logical image pointers may be used to swap designations of buffers at the same frequency level. For example, for a frequency level N, two buffers FN0 and FN1 may be swapped in function by swapping the pointers. In this example, an input buffer FN0 may have its output in FN1, but the next dependent operation now requires that output to be an input in FN0. Instead of copying the data, the image pointers or references may be merely swapped.

Figure 8:
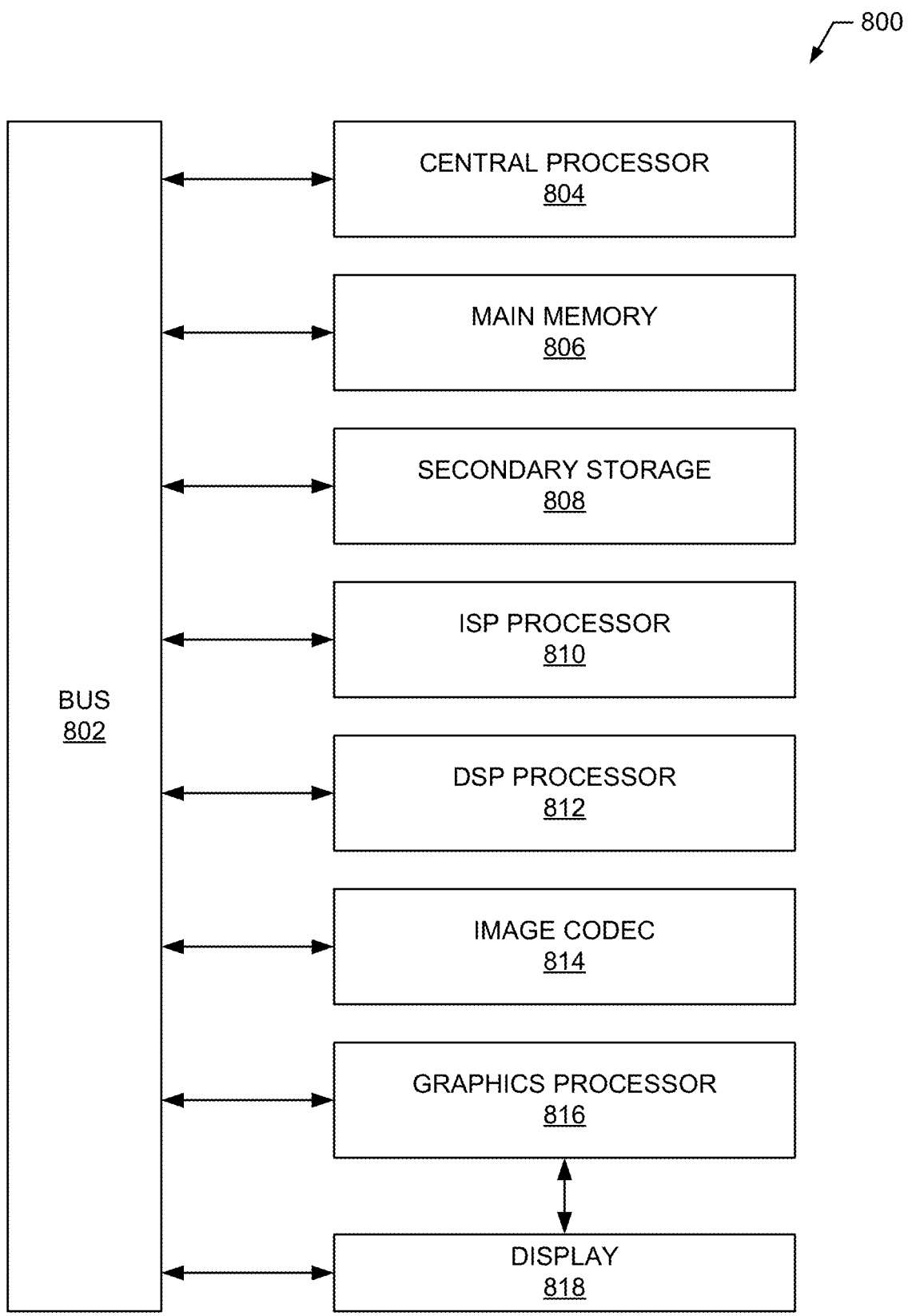
FIG. 8 shows an exemplary embodiment of a Unified Frequency Transform Engine suitable for performing the method of FIG. 1.

FIG. 8 shows an exemplary embodiment of a Unified Frequency Transform Engine 800 suitable for performing the method of FIG. 1. As shown, a UFTE 800 may include at least one host processor 804, which is connected to a communication bus 802. The UFTE 800 also 800 may include a main memory 806. Control logic (software) and data are stored in the main memory 806, which may take the form of random access memory (RAM).

The UFTE 800 also 800 may include a graphics processor 816 and a display 818, i.e. a computer monitor. In one embodiment, the graphics processor 816 may include a plurality of shader modules, a rasterization module, etc. Each of the foregoing modules may be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The UFTE may also be realized by reconfigurable logic which may include (but is not restricted to) field programmable gate arrays (FPGAs). The system may also be realized by DSPs.

The UFTE 800 may also include a secondary storage 808. The secondary storage 808 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 806 and/or the secondary storage 808. Such computer programs, when executed, enable the UFTE 800 to perform various functions described herein. Memory 806, storage 808, are volatile or non-volatile storage, and/or any other type of storage are possible examples of non-transitory computer-readable media.

The UFTE 800 may also include an image codec 814 that can share computation algorithms and data with the UFT. Similarly, the UFTE 800 may also include an image signal processor (ISP) 810 and/or DSP 812 that shares computation algorithms and data for the UFT.

In one embodiment, the architecture and/or functionality of the various previous figures may be implemented in the context of the host processor 804, graphics processor 816, an integrated circuit (not shown) that is capable of at least a portion of the capabilities of both the host processor 804 and the graphics processor 816, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the UFTE 800 may take the form of a desktop computer, laptop computer, and/or any other type of logic. Still yet, the UFTE 800 may take the form of various other devices including, but not limited to a personal digital assistant (PDA) device, a mobile phone device, a television, etc.

Further, while not shown, the UFTE 800 may be coupled to a network [e.g. a telecommunications network, local area network (LAN), wireless network, wide area network (WAN) such as the Internet, peer-to-peer network, cable network, cloud computing, etc.] for communication purposes.

Ancillary Functions in a Plurality of Dimensions

Additionally, exemplary embodiments include extensions and inclusions of ancillary functions to the UFTE in a plurality of dimensions. The fact that an image can be broken down by its spatial frequencies, each an octave (or power of 2) apart, and then reconstructed from those components may be a basis for modern video compression.

The fact that an image can be broken down by its spatial frequencies, each an octave (or power of 2) apart, may be a basis for modern image stabilization. For performance and in instances where high precision motion vectors are desired, lower resolution images may be used to compute a starting approximation used for final calculations subsequently performed at the highest resolution.

The fact that an image can be broken down by its spatial frequencies, each an octave (or power of 2) apart, may be a basis for modern pattern recognition, for improving performance and for multi-resolution pattern matching.

In another embodiment, a UFT engine may export or import image data at various resolutions and with various processing methods applied using its pyramid structure to other external functions such as pattern recognition, image stabilization or other uses, either in the Deconstructor or Reconstructor, and by induction this may be extended to a plurality of dimensions and for a plurality of arbitrary component parameters.

The fact that an image of a plurality of dimensions can be broken down by its spatial frequencies, each an octave (or power of 2) apart, may be used for compression for data compression. In another embodiment analogous to video compression, the N dimensional difference data (Frequency Isolation Image or FII) may be processed by N dimensional, separable, Han or Wavelet transforms to improve run-length or other compression schemes, and other schemes such as Motion Vectors and Saliency may be similarly extended to a plurality of dimensions in a UFT embodiment. In another embodiment, such compression may be applied to data in volatile CPU or GPU memory and decompressed on the fly for better cache localization and reducing unwanted cache evictions during processing.

Since a UFT embodiment can share data and data structures with a pattern recognition engine another embodiment may extend the pattern recognition function from 2 to a plurality of dimensions to constitute object recognition. Since a UFT database may include any measurable component parameters, in another embodiment, a UFT engine along with its ability to enhance desired structure characteristics and suppress others may be used in performing pattern recognition on structures generally, including by example and not by limitation: pressure, density, mass, velocity, gravity, temperature, humidity, molecular and elemental composition, concentrations or ratios, energy, half-life, transparency, opacity, diffusion; electrostatic or electromagnetic potential, force, flux, or charge; population or demographic characteristics, statistical likelihoods, or any other varying parameter.

Low Latency and Hardware Implementations

For some applications, such as video imaging for interactive medical procedures, the latency of the imaging system may have an adverse influence upon user coordination. Therefore, and especially in systems where UFT has been implemented in an FPGA or in direct hardware, an embodiment may use designs to minimize the effect of the UFT on the system latency.

Figure 9:
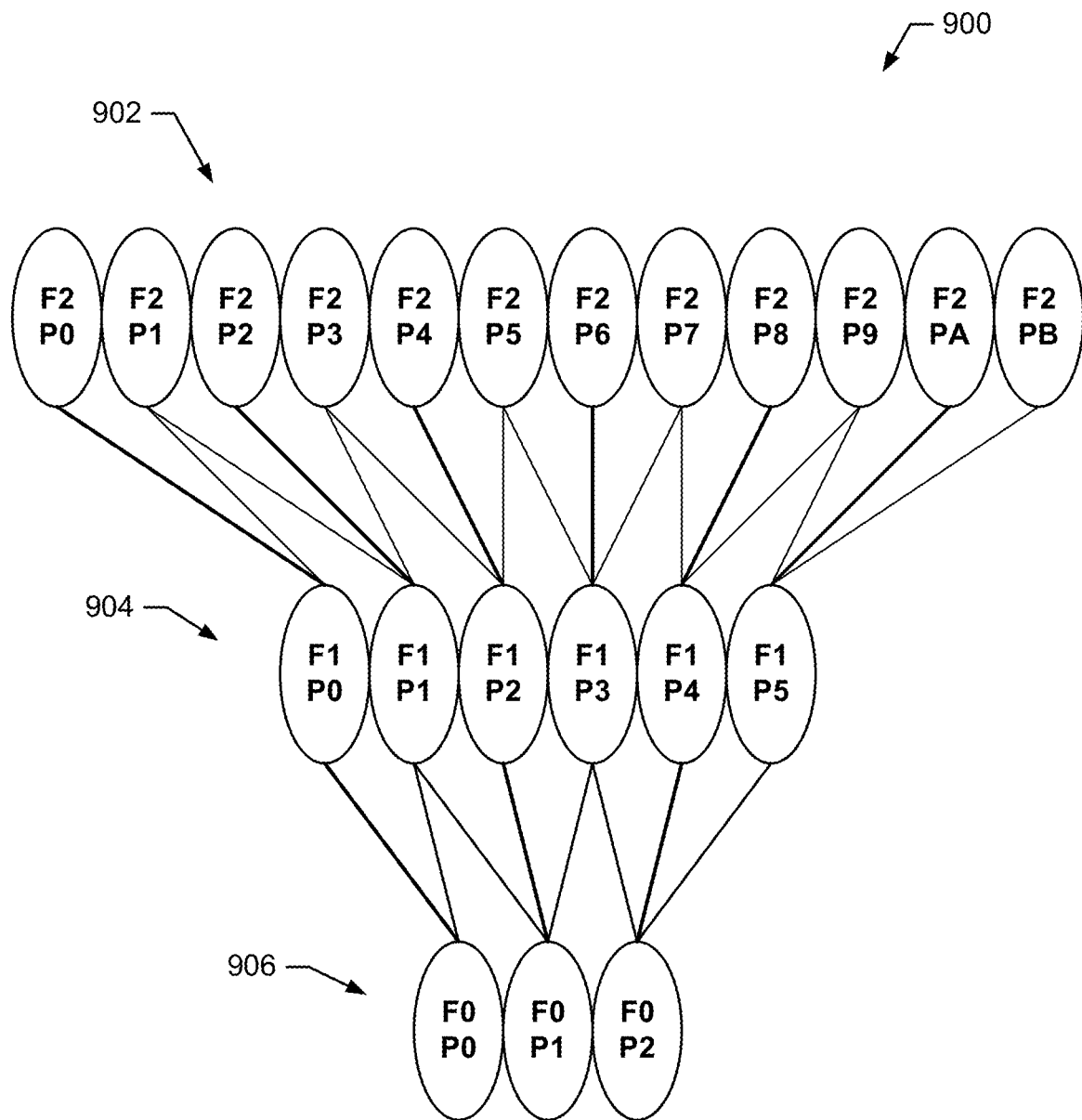
FIG. 9 shows an exemplary 1 dimensional, three frequency level pyramid for use with a UFT.

FIG. 9 shows an exemplary 1 dimensional, three frequency level pyramid 900 for use with a UFT. In an exemplary embodiment, level 902 shows the highest frequency level with 12 pixels (F2P0-F2PB), level 904 shows the next frequency level with 6 pixels (F1P0-F1P5), and level 906 shows the lowest frequency level with 3 pixels (F0P0-F0P2).

In one embodiment the deconstructor 202 is implemented with a compute-as-you-go method without waiting for the full rasterized image to be acquired prior to starting computations. In one embodiment pixel F1P0 may be computed as part of the deconstructor downsampling phase just as soon as pixel F2P1 is acquired, since its area of support is complete. Similarly, pixel F1P1 may be deconstructed just as soon as pixel F2P3 is acquired, since its area of support is complete. Similarly, pixel F0P0 may be deconstructed just as soon as pixel F1P1 is acquired, since its area of support is now complete. When pixel F2PB is finally acquired, only the remaining diagonals of F1P5 and F0P2 remain to be deconstructed. In this manner the deconstructed representation gets progressively completed at an orderly rate as the image is acquired.

In another embodiment, the upsampling phase of the deconstructor 202 is also implemented with a slightly different compute-as-you-go method. In one embodiment pixel F1P1 may be upsampled and differenced as soon as pixel F0P1 is downsampled, and pixel F2P1 may be upsampled and differenced as soon as pixel F0P1 is downsampled. As soon as a pixel is upsampled and differenced it can then be reconstructed. Note that pixel F1P3 and following pixels cannot be upsampled and differenced until pixel F0P2 is downsampled. Similarly, pixel F2P5 and following pixels cannot be upsampled and differenced until pixel F1P3 is downsampled. Thus there is a significant sub-pyramid of residual pixels that must wait until pixel F0P2 is downsampled before being upsampled, differenced, and reconstructed, which only happens after the image is fully acquired. The time to upsample, difference and reconstruct this residual pyramid determines the latency of the UFT system.

Since the relative size of the residual pyramid is affected by the size of the lowest frequency level, in one embodiment this latency may be reduced limiting the depth of the UFT pyramid so as to keep the size of the lowest frequency image from getting smaller than necessary.

In another embodiment, the reconstructor 204 is implemented in a compute-as-you-go method (analogous to the upsampling phase of the deconstructor 202) as the upsampler of the reconstructor 204 creates computing order dependencies analogous the upsampling phase of the deconstructor 202.

In another embodiment, a low-latency UFT implementation may operate in-place, rather than double-buffered as in FIG. 7, thereby reducing the memory footprint by almost half.

Since the processing speeds of the deconstructor upsampling phase and the reconstructor also affects the latency time, in another embodiment, the processing speed of the reconstructor may be increased by the use of faster components and clocks, increased parallelization, and other optimizations. Since the usage of the deconstructor upsampling component and reconstructor is not constant over the image frame time, in another embodiment its electronic components may be controlled such that they are idled and put in "sleep mode" with its clocks and voltage minimized when awaiting new work in order to minimize overall power consumption and thermal output.

While the foregoing example uses a single dimension for clarity of description, in another embodiment, it may be extended to 2 dimensional images where each pixel FnPn is replaced by a row of pixels.

In another embodiment, these low latency designs may be extended to images of a plurality of dimensions, such as still photographs, video streams, or other N-dimensional data sets, as well as an arbitrary number of parameter components and types.

In another embodiment, an N×N bilateral is used in the deconstructor 202, introducing a slightly larger delay in deconstruction of the pixels down the pyramid, as the area of support required from each higher frequency level is larger.

In another embodiment, line buffers sufficient for temporary storage for the data used by any bilaterals may be employed, especially when the UFTE operates on data in-place.

In another embodiment, the foregoing description may be extended to a plurality of dimensions by induction.

In another embodiment, by combining the above embodiments, the processing latency of UFT image enhancement may be reduced to just a fraction of a frame time.

Basis in Physiological Model of Human Perception

The above processes may have a physiological basis and may mimic human perception in a natural way. Human perception of clarity may be determined at least in part by the perception of contrast. Natural impediments to clarity such as haze, scatter, veiling glare, all may add scattered light that effectively "fogs" the image, which may reduce the contrast visible to the eye. Images with very high resolution may not appear to be very clear if they lack contrast, especially at medium spatial frequencies.

Figure 12:
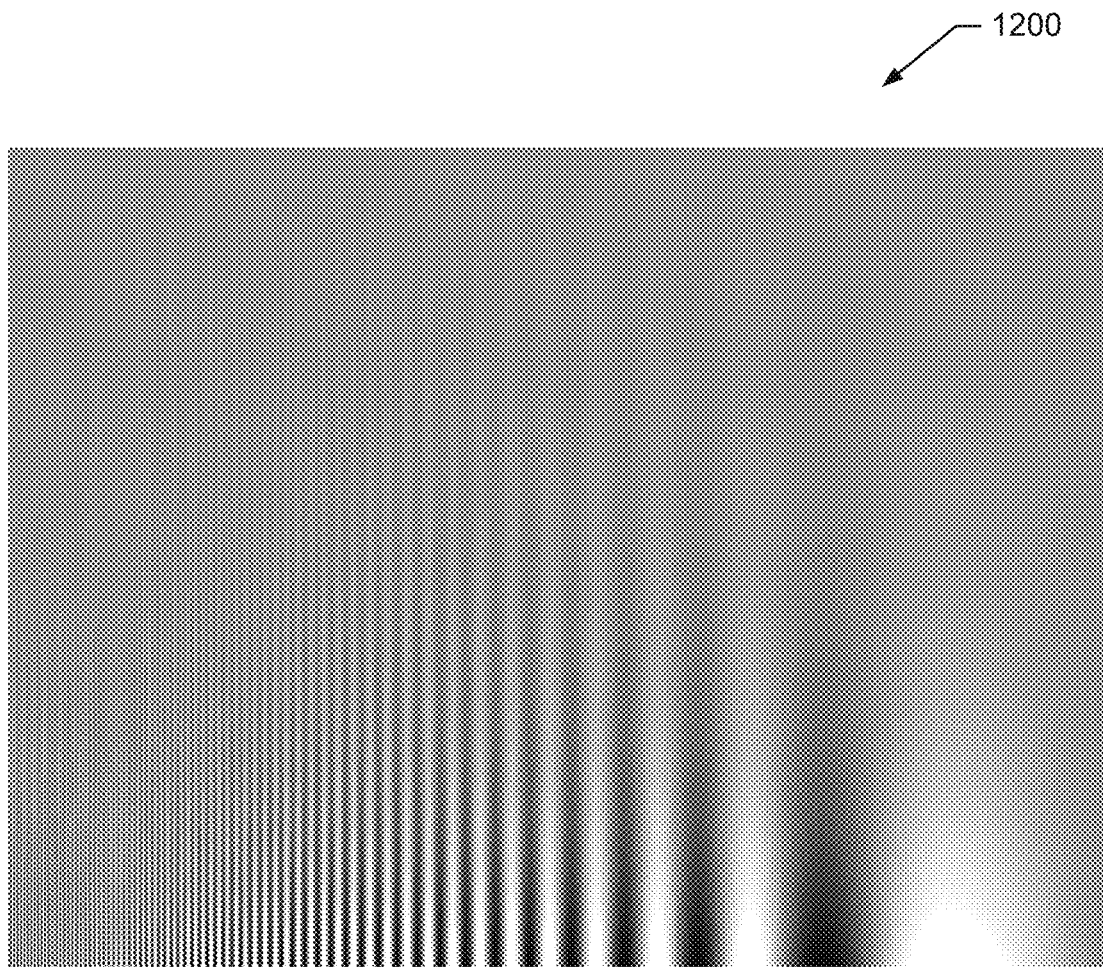
FIG. 12 shows a known human contrast sensitivity chart.

FIG. 12 shows a known human contrast sensitivity chart 1200. The chart illustrates the human perceptual system to discern contrast based on spatial frequency. Note by observing the chart that this ability is highest in the middle frequencies and falls off at the highest and lowest frequencies.

The use of conventional high frequency sharpening may not increase the overall perception of clarity because other spatial frequencies are left unchanged. Only a perception of sharpness may be generated. By employing multi-resolution sharpening the contrast may be increased in a way that mimics the effects of greater overall clarity, which may give the entire image a clearer presentation. In fact, multi-resolution contrast enhancement may be increased past that of even of a perfectly clear scene itself (e.g., a condition of super-clarity, etc.). Also, multi-resolution sharpening retains its sharpening effect over a wide range of image resizing, such as displays on differently sized devices.

Figure 13:
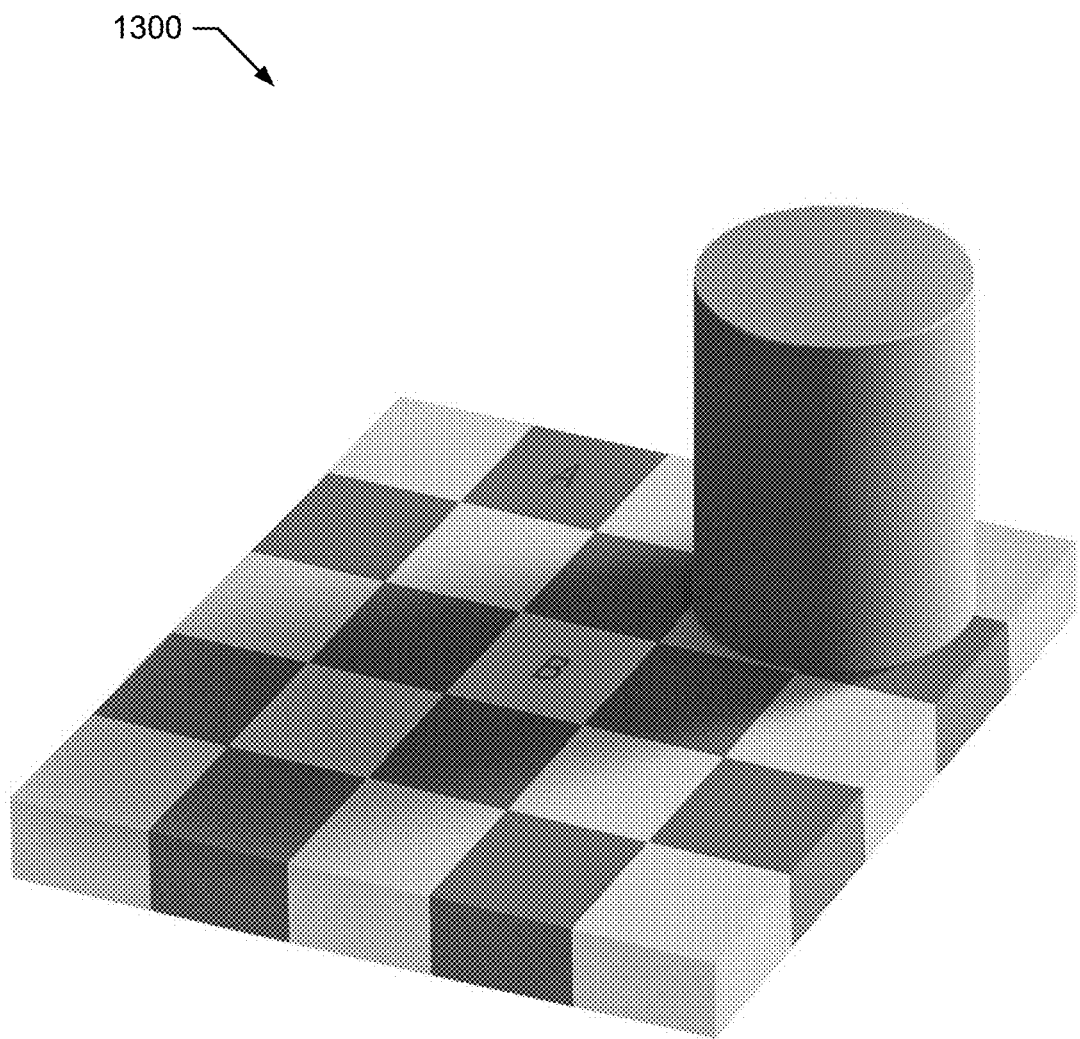
FIG. 13 shows a known Edward H. Adelson checkerboard.

It has been suggested that humans may perform some type of local tonemapping in their perceptual vison systems. Consider FIG. 13 which shows a known Edward H. Adelson checkerboard image 1300. For example, in the image 1300, the squares A and B appear to have different brightnesses, but are in fact the same. This demonstrates that brightness is perceived in a spatially relational way.

Figure 14:
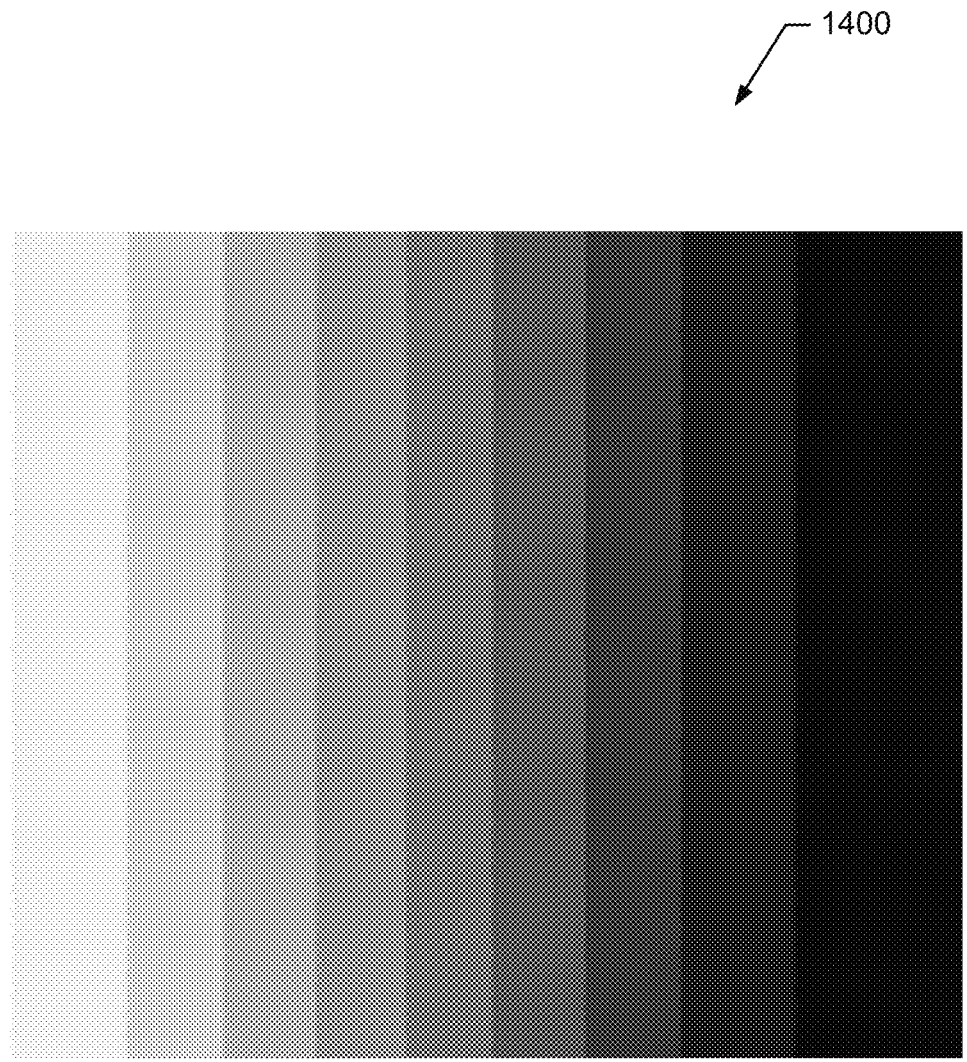
FIG. 14 shows a known step wedge image.

FIG. 14 shows a known step wedge image 1400. The step wedge image demonstrates an optical illusion. For example, halos may be one of the common artifacts for local tonemapping. In looking at the edges between the different steps in the gray scale step wedge 1400, the darker side may appear darker at the edge and the lighter side may appear lighter at the edge. Halos are a common artifact of local tonemapping, and since they are not part of the step wedge image itself, then they must come from human perceptual physiology. In another embodiment, the frequency control provided by the UFT may be utilized to add a reverse halo component at the edges to neutralize the effect of natural perception of halos at the edges.

Additionally, for whatever local tonemapping the human perception performs, it does so without introducing the kinds of color distortions or loss of detail that are associated with gamut excursions in conventional image enhancement systems. To effectively mimic human perception, an image enhancement system must effective manage gamut relationships in a realistic way.

Figure 15:
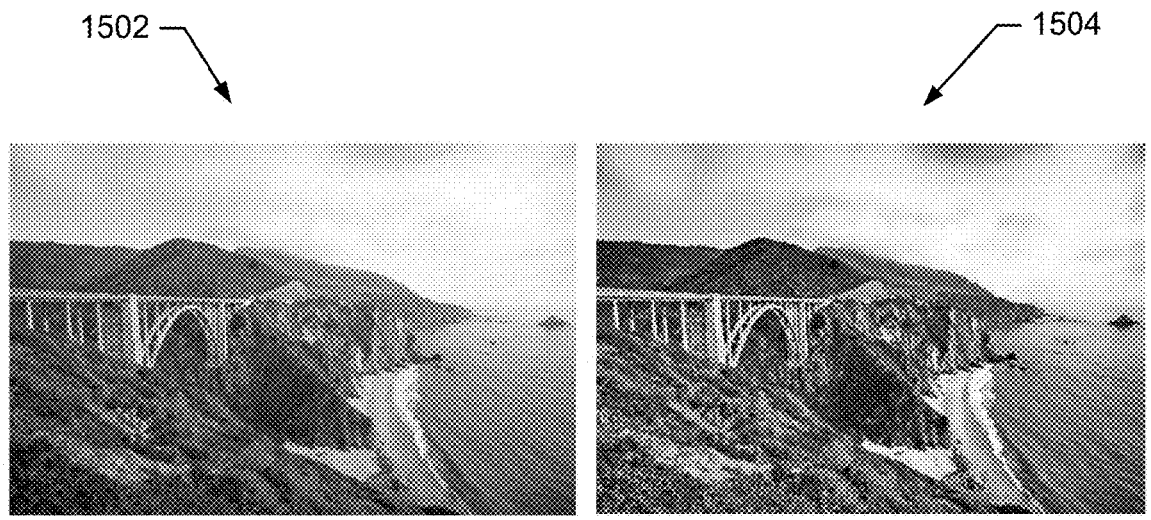
FIG. 15 shows an exemplary embodiment of an enhanced pictorial image that results after application of a UFT to an unadjusted pictorial image in accordance with the exemplary embodiments.

FIG. 15 shows an exemplary embodiment of an enhanced pictorial image that results after application of a UFT to an unadjusted pictorial image in accordance with the exemplary embodiments. For example, the adjusted pictorial image 1504 results after applying a UFT to an unadjusted pictorial image 1502.

FIG. 16 shows two different results of applying a UFT with different settings to an unadjusted medical image in accordance with the exemplary embodiments. For example, there is evidence that the human perceptual system uses low spatial frequency components for shape and depth queues. For example, image 1602 shows an unenhanced image and image 1606 shows an image where a UFT has been applied amplifying the low spatial frequencies, but not the high ones. Note the enhanced perception of shape and depth, but the fine detail remains the same. Also note the differences from image 1604 where UFT has also been applied but amplifies all the spatial frequencies more evenly, enhancing fine details as well as shape and depth.

Figure 17:
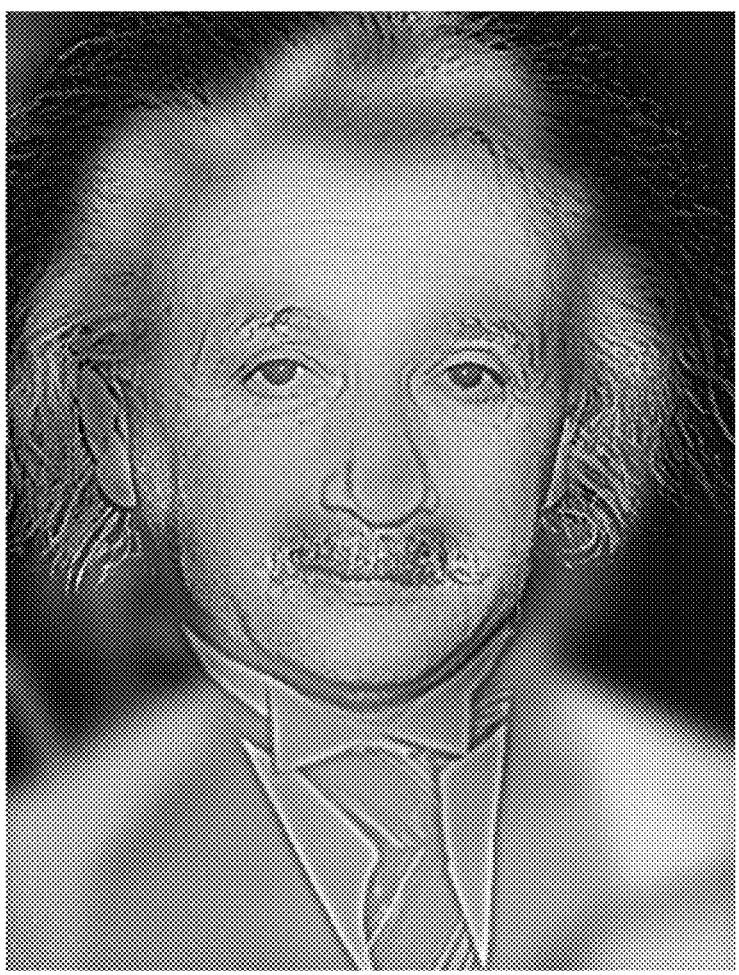
FIG. 17 shows a known "Einstein" optical illusion image.
Figure 17:
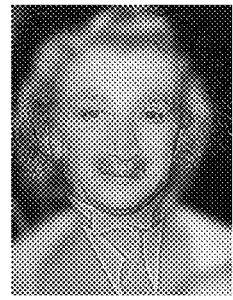

FIG. 17 shows a known "Einstein" optical illusion image 1700. It has been suggested that human pattern recognition is highly resolution dependent and this is illustrated in the Einstein image 1700. The higher resolution component contains an image of Einstein, but the low frequency component contains an image of Marilyn Monroe, which is not recognized unless the size of the Einstein image 1700 is greatly reduced 1702 to present the low frequency in a scale suitable for the human pattern recognition system. Since a UFT can share lower resolution images from its pyramid with other algorithms, in another embodiment it can pass low frequency content to a pattern recognition engine to discern patterns at frequencies not easily perceived or subliminal to the human eye. In another embodiment, a UFT may use frequency morphing to inject low frequency image content into the reconstructed image in a way that is subliminal to the conscious human perceptual system. In another embodiment, these methods may be included in a UFT using a plurality of dimensions and a plurality of arbitrary component parameters.

Exemplary Method of Operation

Figure 18:
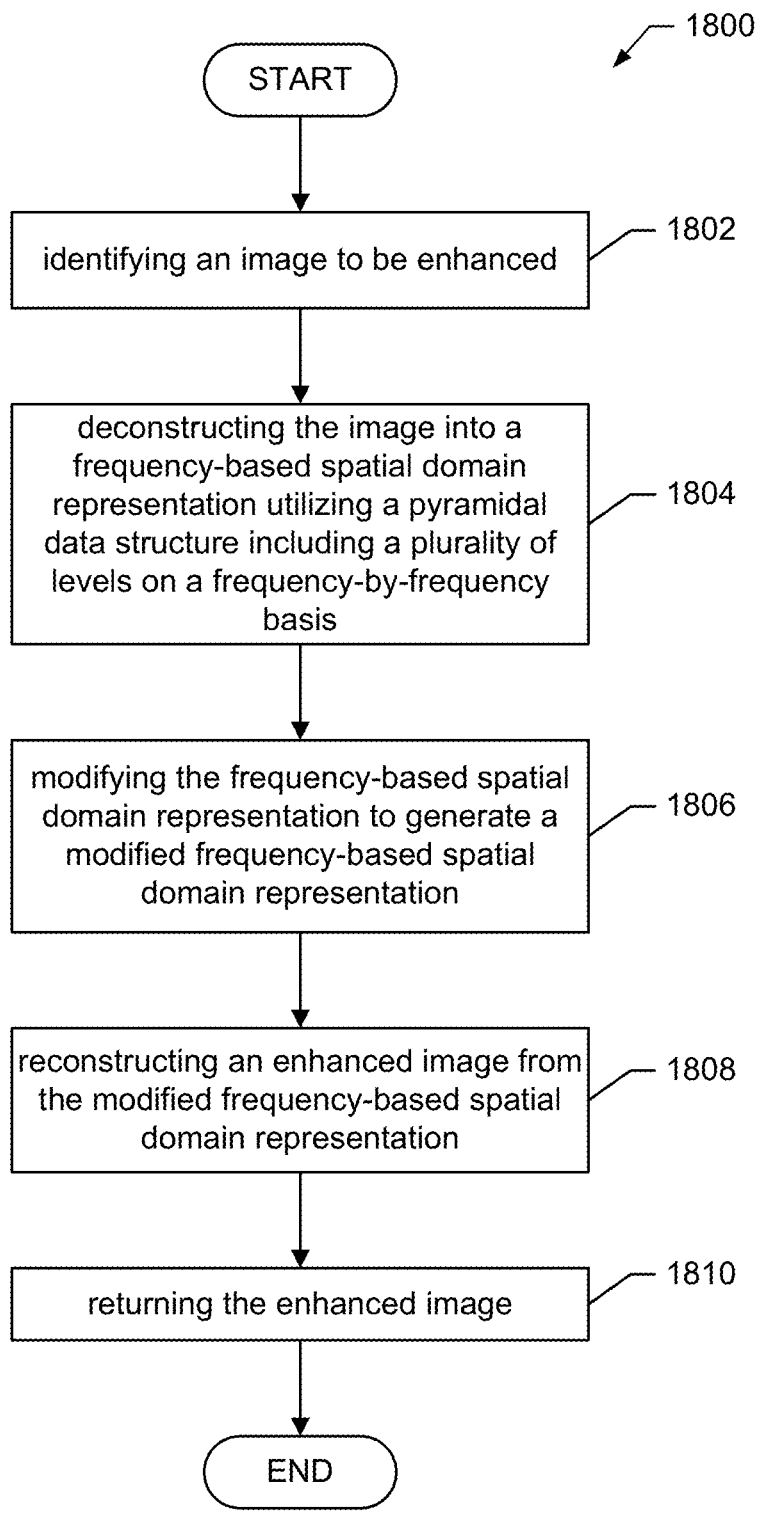
FIG. 18 shows an exemplary method for enhancing an identified image using a UFT in accordance with the exemplary embodiments.

FIG. 18 shows an exemplary method 1800 for enhancing an identified image using a UFT in accordance with the exemplary embodiments. For example, the method 1800 is suitable for use with the UFTE 200 shown in FIG. 2.

At block 1802, an image to be enhanced is identified. For example, the image 208 is identified, which may be a stored image in a memory or a streaming image from a device.

At block 1804, the identified image is deconstructed into a frequency-based spatial domain representation. For example, the deconstructor 202 operates to deconstruct the image into the frequency-based spatial domain representation. For example, in an exemplary embodiment, the deconstructor 202 operates to perform a downward pass that operates on a plurality of levels of the pyramidal data structure on a sequential frequency-by-frequency basis from higher to lower frequency to downsample at each level to generate a lower resolution downsampled image and a residue image at the lowest level. The deconstructor 202 also operates to perform an upward pass in a sequential frequency-by-frequency basis from lower to higher frequency to upsample the lower resolution downsampled image to generate an upsampled image. The deconstructor 202 further operates to perform subtracting the upsampled image from the downsampled image for each frequency level of the pyramid to generate a frequency isolated image for each pyramid level to produce a frequency-based spatial domain representation.

At block 1806, the frequency-based spatial domain representation of the image is modified to generate a modified frequency-based spatial domain representation of the image. For example, the modification is performed by the reconstructor 204.

At block 1808, an enhanced image is reconstructed from the modified frequency-based spatial domain representation of the image. For example, the reconstruction is performed by the reconstructor 204. For example, in an exemplary embodiment, the reconstructor 204 operates to perform an upward pass on the frequency-based spatial domain representation in a sequential frequency-by-frequency basis from lower to higher frequency to produce a blended output image at each frequency level. In an exemplary embodiment, the reconstructor 204 produces the blended output image at each frequency level by: upsampling the lower frequency's blended output image or the residue image to generate an upsampled image; modifying the frequency isolated image for each pyramid level to generate a modified frequency isolated image; modifying the upsampled image for each pyramid level to generate a modified upsampled image; blending the modified frequency isolated image for each pyramid level with the modified upsampled image to generate an blended output image at each pyramid level for input to the next higher frequency level; and returning a highest resolution blended output image as the enhanced image.

At block 1810, an enhanced image is returned. For example, the enhanced image 210 is written back into memory or provided as an output stream to another device.

Description Illustrative and not Limiting

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

For example, descriptions of embodiments using the YUV TV-style luma/chroma colorspace are used for illustrative purposes; however, the practitioner with ordinary skill in the art will appreciate that these embodiments may be trivially applied to other colorspaces as well.

References to "one embodiment," "an embodiment," "example embodiment," "various embodiments," "exemplary embodiment," "one aspect," "an aspect," "exemplary aspect," "various aspects," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

In accordance with the embodiments of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

What is claimed is:

1. A method for enhancing an image, comprising,
identifying an image;
deconstructing the image into a frequency-based spatial domain representation utilizing a pyramidal data structure that includes a plurality of levels on a frequency-by-frequency basis and wherein a portion of the levels each includes an associated Frequency Isolation Image (FII);
reconstructing an enhanced image from the frequency-based spatial domain representation utilizing a frequency blender to amplify selected frequency levels of the frequency-based spatial domain representation by applying amplification to the FII to enhance contrast to augment low spatial frequency perception of contours and depth, and wherein the frequency blender avoids exceeding available dynamic range at each level; and
returning the enhanced image.

2. The method of claim 1, wherein the deconstructing comprises creating the frequency-based spatial domain representation by: performing a downward pass that operates on the plurality of levels of the pyramidal data structure on a sequential resolution-by-resolution basis from higher to lower resolution to downsample at each level other than a lowest level to generate a lower resolution downsampled instance for that level, wherein a highest level instance is the identified image and the lowest level downsampled instance is also called the residue instance; performing an upward pass in a sequential resolution-by-resolution basis from lower to higher resolution and starting at a next-to-lowest resolution level, to upsample the next lower resolution downsampled instance at each level to generate an upsampled representation for that level; and subtracting the upsampled representation from the downsampled instance to generate a frequency isolation representation for that pyramid level.

3. The method of claim 1, wherein the reconstructing the enhanced image from the frequency-based spatial domain representation utilizing the frequency blender to perform the blending of the plurality of levels, and wherein a residue instance also constitutes a blended representation at the lowest pyramid level, comprises: performing an upward pass that operates on the plurality of levels of the pyramidal data structure on a sequential resolution-by-resolution basis from lower to higher resolution and starting at the next-to-lowest resolution level, to produce a frequency blended representation at each resolution level by: modifying the frequency isolated representation at that pyramid level to generate a modified frequency isolated representation; upsampling the frequency blended representation for the next lower resolution pyramid level, to generate a modified blended representation; and blending the modified frequency isolated representation at that pyramid level with the modified blended representation to generate the frequency blended representation at that pyramid level; and returning one or more of the frequency blended representations as the enhanced image.

4. The method of claim 2, the deconstructing further comprising tuning the downsampling of the downward pass and the upsampling of the upward pass to best isolate a Nyquist frequency only and not lower frequency content in each Frequency Isolation Image.

5. The method of claim 1, the reconstructing further comprising performing spatially localized tonemapping.

6. The method of claim 1, the reconstructing further comprising performing noise filtration.

7. The method of claim 1, the reconstructing further comprising performing multi-resolution contrast manipulation.

8. The method of claim 1, the reconstructing further comprising performing multi-resolution clarity manipulation.

9. The method of claim 1, the reconstructing further comprising performing dynamic headroom management.

10. The method of claim 1, the reconstructing further comprising performing smart brightness control that spatially constrains brightness to prevent clipping.

11. The method of claim 1, the reconstructing further comprising performing spatial manipulation of at least one of: color values; saturation; and color gamut management.

12. The method of claim 1, the reconstructing further comprising performing spatial local tonemapping adjustments to improve spatial color gamut management.

13. The method of claim 1, the reconstructing further comprising generating photographic masks for use in conventional photographic printing.

14. The method of claim 1, the reconstructing further comprising generating physical masks of attenuating material of spatially varying depth for use in spatially attenuating rays used for imaging.

15. The method of claim 1, the reconstructing further comprising performing focus accuracy estimation and providing hinting for focus adjustments.

16. The method of claim 1, the reconstructing further comprising performing viewer control of enhancement.

17. The method of claim 1, the reconstructing further comprising performing frequency morphing with a plurality of images.

18. The method of claim 1, wherein the image is obtained from at least a portion of a video stream, and wherein the image includes a time domain dimension.

19. The method of claim 1, wherein the method for enhancing the identified image includes processing of parametric databases of a plurality of dimensions and a plurality of varying component parameters, and wherein the identified image and the enhanced image are such parametric databases having a selected number of dimensions and a selected number of component parameters.

20. The method of claim 1, wherein the method for enhancing the identified image includes multi-resolution co-processing of inter-related parameters.

21. The method of claim 1, further comprising enhancing at least one image in at least one of:
a jpeg image encoding engine;
a mpeg image encoding engine;
a jpeg image decoding engine;
a mpeg image decoding engine; and
any other codec engine.

22. The method of claim 1, further comprising sharing through a shared interface at least one of the pyramid, data, computations, and results of computations with at least one of an image codec, video stabilization, face detection, pattern recognition function, or other local tonemapping or image enhancement function on a spatial frequency basis.

23. The method of claim 1, wherein the method is performed by a plug-in or part of a still picture, video, or database editing or viewing function.

24. The method of claim 1, further comprising configuring the method for low latency.

25. The method of claim 1, further comprising utilizing at least one programmable unit interval transform (PUTT) that takes an input value in the unit interval range and produces an output value in the unit interval range by performing at least one of a fixed function and a programmable function, and wherein the programmable unit interval transform is used for at least one of a control mechanism and a user interface.

26. The method of claim 1, further comprising performing the method in a system on a chip (SOC) for inclusion in at least one of a television and a monitor to apply to at least one of broadcast content, playback content, and video game inputs.

27. The method of claim 1, further comprising performing the method in video games as a post-rendering operation to achieve at least one of:
local tonemapping;
increased apparent dynamic range;
enhanced clarity;
enhanced shape and contour perception;
enhanced depth perception; and
managing gamut for best saturation without gamut excursions.

28. An apparatus, comprising,
a deconstructor that deconstructs an image into a frequency-based spatial domain representation utilizing a pyramidal data structure that includes a plurality of levels on a frequency-by-frequency basis and wherein a portion of the levels each includes an associated Frequency Isolation Image (FII); and
a reconstructor that reconstructs an enhanced image from the frequency-based spatial domain representation utilizing a frequency blender to amplify selected frequency levels of the frequency-based spatial domain representation by applying amplification to the FIT to enhance contrast to augment low spatial frequency perception of contours and depth, and wherein the frequency blender avoids exceeding available dynamic range at each level.

29. The apparatus of claim 28, wherein the deconstructor comprises: a downsampling phase deconstructor that performs a downward pass that operates on the plurality of levels of the pyramidal data structure on a sequential resolution-by-resolution basis from higher to lower resolution using a downsampler to downsample at each level other than a lowest level to generate a lower resolution downsampled instance for that level, wherein a highest level instance is the image, and the lowest level downsampled instance is also called the residue instance; and a upsampling phase deconstructor that performs an upward pass in a sequential resolution-by-resolution basis from lower to higher resolution and starting at a next-to-lowest resolution level, and comprising an upsampler to upsample a next lower resolution downsampled instance at each level to generate an upsampled representation for that level, and comprising a difference generator to subtract the upsampled representation from the downsampled instance to generate a frequency isolation representation for that pyramid level.

30. The apparatus of claim 28, wherein the reconstructor comprises: a upsampling phase reconstructor that performs an upward pass that operates on the plurality of levels of the pyramidal data structure on a sequential resolution-by-resolution basis from lower to higher resolution and starting at the next-to-lowest resolution level, to produce a frequency blended representation at each resolution level, and wherein a residue instance also constitutes a blended representation at the lowest pyramid level, and wherein the upsampling phase reconstructor comprises: an aggregate contrast factor processor that processes the frequency isolated representation at that pyramid level to generate a modified frequency isolated representation; an aggregate headroom factor processor that upsamples the frequency blended representation for the next lower resolution pyramid level, to generate a modified blended representation; wherein the frequency blender blends the modified frequency isolated representation at that pyramid level with the modified blended representation to generate frequency blended representation at that pyramid level; and wherein the reconstructor returns one or more of the frequency blended representations as the enhanced image.

31. The apparatus of claim 29, further comprising tuned downsamplers and upsamplers to best isolate a Nyquist frequency only and exclude frequency content from other frequencies at each frequency level in the downward and upward passes, respectively.

32. The apparatus of claim 28, wherein the reconstructor performs spatially localized tonemapping.

33. The apparatus of claim 28, wherein the reconstructor performs noise filtration.

34. The apparatus of claim 28, wherein the reconstructor performs multi-resolution contrast manipulation.

35. The apparatus of claim 28, wherein the reconstructor performs multi-resolution clarity manipulation.

36. The apparatus of claim 28, wherein the reconstructor performs dynamic headroom management.

37. The apparatus of claim 28, wherein the reconstructor performs smart brightness control that spatially constrains brightness to prevent clipping.

38. The apparatus of claim 28, wherein the reconstructor performs spatial manipulation of color values and saturation.

39. The apparatus of claim 28, wherein the reconstructor performs spatial color gamut management.

40. The apparatus of claim 28, wherein the reconstructor performs spatial local tonemapping adjustments as a means of improving spatial color gamut management.

41. The apparatus of claim 28, wherein the reconstructor generates photographic masks for use in conventional photographic printing.

42. The apparatus of claim 28, wherein the reconstructor generates physical masks of attenuating material of spatially varying depth for use in spatially attenuating rays used for imaging.

43. The apparatus of claim 28, wherein the reconstructor performs focus accuracy estimation and providing hinting for focus adjustments.

44. The apparatus of claim 28, further comprising user controls to perform viewer control of enhancement.

45. The apparatus of claim 28, wherein the reconstructor performs frequency morphing with a plurality of images.

46. The apparatus of claim 28, wherein the image is obtained from at least a portion of a video stream, and wherein the image includes a time domain dimension.

47. The apparatus of claim 28, wherein the apparatus processes parametric databases of a plurality of dimensions and a plurality of varying component parameters, and wherein the identified image and the enhanced image are such parametric databases having a selected number of dimensions and a selected number of component parameters.

48. The apparatus of claim 28, wherein the apparatus performs the co-processing of inter-related parameters.

49. The apparatus of claim 28, wherein the apparatus is used in the pyramid processing of at least one image in-at least one of:
 a jpeg image encoding engine;
 a mpeg image encoding engine;
 a jpeg image decoding engine;
 a mpeg image decoding engine; and
 any other codec engine.

50. The apparatus of claim 28, wherein the apparatus is used with a shared interface to share at least one of the pyramid, data, computations, and results of computations with at least one of an image codec, video stabilization function, face detection and/or pattern recognition function, other local tonemapping or image enhancement function on a spatial frequency basis.

51. The apparatus of claim 28, wherein the apparatus is configured for low latency.

52. The apparatus of claim 28, further comprising at least one programmable unit interval transform (PUIT) engine that takes an input value in the unit interval range and produces an output value in the unit interval range by performing at least one of a fixed function and a programmable function, and the programmable unit interval transform engine is used for at least one of a control mechanism and a user interface.

53. The apparatus of claim 28, wherein the apparatus is used in a system on a chip (SOC) for inclusion in at least one of:
 a television; and
 a monitor;
 to apply to at least one of:
 broadcast content;
 playback; and
 video game inputs.

54. The apparatus of claim 28, wherein the apparatus is used in video games for post-rendering to achieve at least one of:
 local tonemapping;
 increased apparent dynamic range;
 enhanced clarity;
 enhanced shape and contour perception;
 enhanced depth perception; and
 managing gamut for best saturation without gamut excursions.

55. A method for enhancing a parametric database, comprising,
 identifying a parametric database having one or more dimensions, wherein each dimension has one or more parameters, wherein each parameter has one or more varying values, and wherein the parametric database is not restricted to color or black and white images;
 enhancing the parametric database utilizing a pyramid data structure that includes a plurality of levels as input to and output from a frequency blender, wherein each of the plurality of levels of the pyramid data structure includes an instance of the parametric database having a unique parameter sampling resolution, a frequency isolation representation at that resolution, and a frequency blended representation of the parametric database at that resolution;
 utilizing the frequency blender to perform blending of the plurality of levels of the pyramid data structure, wherein the frequency blender amplifies the frequency isolation representation for one or more parameters at selected frequency levels of the pyramidal data structure to adjust contrast to augment low spatial frequency perception of contours and depth, and wherein the frequency blender avoids exceeding available dynamic range at each level; and
 returning the enhanced parametric database.

56. The method of claim 55, further comprising: performing a downward pass that operates on the plurality of levels of the pyramidal data structure on a sequential resolution-by-resolution basis from higher to lower resolution to downsample at each level other than a lowest level to generate a lower resolution downsampled instance for that level where a highest level instance is the identified parametric database itself and the lowest level downsampled instance is also called a residue instance and also constitutes the frequency blended representation at the lowest pyramid level; performing an upward pass in a sequential resolution-by-resolution basis from lower to higher resolution and starting at a next-to-lowest resolution level, to upsample a next lower resolution downsampled instance at each level to generate an upsampled representation for that level, and subtracting the upsampled representation from the downsampled instance to generate a frequency isolation representation for that pyramid level; and performing an upward pass that operates on the plurality of levels of the pyramidal data structure on a sequential resolution-by-resolution basis from lower to higher resolution and starting at the next-to-lowest resolution level, and utilizing the frequency blender to produce the frequency blended representation at each resolution level by: modifying the frequency isolated representation at that pyramid level to generate a modified frequency isolated representation; performing at least one of: upsampling the frequency blended representation for the next lower resolution pyramid level and modifying the result; to generate a modified blending representation; and blending the modified frequency isolated representation at that pyramid level with the modified blending representation to generate the frequency blended representation at that pyramid level and returning one or more of the frequency blended representations as the enhanced parametric database.

57. The method of claim 55, wherein the parametric database is an image, the instances of the parametric database having a unique parameter sampling resolutions are images, the frequency isolation representation is a frequency isolation image, the frequency blended representation is a blended image, and the enhanced parametric database is an image.

58. The method of claim 55, further comprising reducing data space required in the pyramid data structure by utilizing a multi-purpose working data area to allow the instance of the parametric database having a unique parameter sampling resolution at a given pyramid level, be overwritten by the frequency blended representation of the parametric database at that resolution produced by the blender at that pyramid level, thereby reducing the number of data buffers from 3 to 2 at each pyramid level.

59. The method of claim 55, wherein enhancing the parametric database includes tuning the downsampling of the downward pass and the upsampling of the upward passes to best isolate a Nyquist frequency only and exclude frequency content from other frequencies at each frequency level.

60. The method of claim 55, wherein enhancing the parametric database includes performing noise filtration at one or more pyramid levels on at least one of:
    a downsampled instance;
    a frequency isolated representation;
    within the blender; and
    a frequency blended representation.

61. The method of claim 55, wherein enhancing the parametric database includes performing at least one of:
    noise filtration;
    spatially localized tonemapping;
    multi-resolution contrast manipulation;
    multi-resolution dynamic headroom management;
    multi-resolution sharpness manipulation;
    multi-resolution clarity manipulation;
    multi-resolution manipulation of shape and contour perception;
    multi-resolution manipulation of depth perception;
    multi-resolution smart intensity control that spatially constrains intensity to prevent clipping;
    performing multi-resolution spatial manipulation of at least one of: color values; saturation; and color gamut management;
    multi-resolution spatial local tonemapping adjustments to improve spatial color gamut management; and
    performing focus accuracy estimation and providing hinting for focus adjustments.

62. The method of claim 55, wherein enhancing the parametric database includes performing multi-resolution manipulation such that the effect of the manipulation appears similar regardless of at least one of: initial database resolution, ultimate database resolution, display resolution, display size, and viewing distance.

63. The method of claim 55, wherein enhancing the parametric database includes generating at least one of:
    photographic masks for use in conventional photographic printing; and
    physical masks of attenuating material of spatially varying depth for use in spatially attenuating rays used for imaging.

64. The method of claim 55, further comprising performing viewer control of enhancement.

65. The method of claim 55, further comprising performing frequency morphing with a plurality of parametric databases.

66. The method of claim 55, wherein the parametric database is obtained from at least a portion of a video stream, and wherein the parametric database includes a time domain dimension.

67. The method of claim 55, wherein enhancing the identified parametric database includes multi-resolution co-processing of inter-related parameters.

68. The method of claim 55, further comprising enhancing of at least one image in at least one of:
    a jpeg image encoding engine;
    a mpeg image encoding engine;
    a jpeg image decoding engine;
    a mpeg image decoding engine; and
    any other codec engine.

69. The method of claim 55, further comprising sharing through a shared interface at least one of the pyramid, data, computations, and results of computations with at least one of an image codec, video stabilization, face detection and/or pattern recognition function, other local tonemapping or image enhancement function on a spatial frequency basis.

70. The method of claim 55, wherein the method is performed by a plug-in or part of a still picture, video, or database editing or viewing function.

71. The method of claim 55, further comprising configuring the method for low latency.

72. The method of claim 55, further comprising utilizing at least one programmable unit interval transform (PUIT) that takes an input value in the unit interval domain and produces an output value in the unit interval range using at least one of a fixed function and programmable functions, and wherein the programmable unit interval transform is used for at least one of a control mechanism and a user interface.

73. The method of claim 55, further comprising performing the method in a system on a chip (SOC) for inclusion in at least one of a television and a monitor to apply to at least one of broadcast content, playback content, and video game inputs.

74. The method of claim 55, further comprising performing the method in video games.

* * * * *